(12) United States Patent
Li et al.

(10) Patent No.: US 11,648,946 B2
(45) Date of Patent: May 16, 2023

(54) INTELLIGENT VEHICLE PLATOON LANE CHANGE PERFORMANCE EVALUATION METHOD

(71) Applicant: SOUTHEAST UNIVERSITY, Nanjing (CN)

(72) Inventors: Xu Li, Nanjing (CN); Weiming Hu, Nanjing (CN); Qimin Xu, Nanjing (CN); Kun Wei, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 17/768,765

(22) PCT Filed: Apr. 12, 2021

(86) PCT No.: PCT/CN2021/086571
§ 371 (c)(1),
(2) Date: Apr. 13, 2022

(87) PCT Pub. No.: WO2021/233005
PCT Pub. Date: Nov. 25, 2021

(65) Prior Publication Data
US 2022/0379893 A1    Dec. 1, 2022

(30) Foreign Application Priority Data
May 21, 2020   (CN) .......................... 202010436610.1

(51) Int. Cl.
*B60W 30/18*  (2012.01)
*B60W 30/165* (2020.01)
(Continued)

(52) U.S. Cl.
CPC .... *B60W 30/18163* (2013.01); *B60W 30/165* (2013.01); *B60W 30/18145* (2013.01);
(Continued)

(58) Field of Classification Search
CPC ......... B60W 30/165; B60W 30/18163; B60W 30/18145; B60W 40/072; B60W 40/114;
(Continued)

(56) References Cited

U.S. PATENT DOCUMENTS

| | | |
|---|---|---|
| 5,880,362 A | 3/1999 | Tang et al. |
| 10,937,107 B2 * | 3/2021 | Shalev-Shwartz ........................... B62D 15/0265 |

(Continued)

FOREIGN PATENT DOCUMENTS

| | | |
|---|---|---|
| CN | 106153352 A | 11/2016 |
| CN | 108983219 A | 12/2018 |

(Continued)

OTHER PUBLICATIONS

Wang, Ruifeng, Formation Control of Multiple Direct-Drive Pure Electric Autonomous Vehicles under Complex Enviroments, Thesis, Southeast University, Apr. 15, 2018, 86 pages.

(Continued)

*Primary Examiner* — Peter D Nolan
*Assistant Examiner* — Wae L Louie
(74) *Attorney, Agent, or Firm* — Muncy, Geissler, Olds & Lowe, P.C.

(57) ABSTRACT

The present invention discloses an intelligent vehicle platoon lane change performance evaluation method. First, an intelligent vehicle platoon lane change performance test scenario is established; secondly, a three-degree of freedom nonlinear dynamics model is established according to motion characteristics of intelligent vehicles in a platoon lane change process; further, an improved adaptive unscented Kalman filter algorithm is utilized to perform filter estimation on state variables of positions and velocities of platoon vehicles; and finally, based on accurately recursive vehicle motion state parameters, evaluation indexes for (Continued)

platoon lane change performance are proposed and quantified, and an evaluation system for platoon lane change performance is constructed. According to the method proposed in the present invention, the problem of lacking platoon lane change performance quantitative evaluation at present is solved, vehicle motion state parameters can be measured in a high-precision and comprehensive manner, multi-dimensional platoon lane change performance evaluation indexes are quantified and output, and comprehensive, accurate, and reliable scientific quantitative evaluation for platoon lane change performance is achieved.

1 Claim, 4 Drawing Sheets

(51) Int. Cl.
*B60W 40/072* (2012.01)
*B60W 40/114* (2012.01)
*B60W 40/13* (2012.01)
*B60W 50/00* (2006.01)
*G05D 1/02* (2020.01)
*G08G 1/00* (2006.01)

(52) U.S. Cl.
CPC ........ *B60W 40/072* (2013.01); *B60W 40/114* (2013.01); *B60W 40/13* (2013.01); *B60W 50/0098* (2013.01); *G05D 1/0293* (2013.01); *G05D 1/0295* (2013.01); *G08G 1/22* (2013.01); *B60W 2040/1323* (2013.01); *B60W 2050/0028* (2013.01); *B60W 2050/0052* (2013.01); *B60W 2552/30* (2020.02); *B60W 2556/60* (2020.02); *B60W 2710/207* (2013.01); *G05D 2201/0213* (2013.01)

(58) Field of Classification Search
CPC ............ B60W 50/0098; G05D 1/0293; G05D 1/0295; G08G 1/22
See application file for complete search history.

(56) References Cited

U.S. PATENT DOCUMENTS

| | | | |
|---|---|---|---|
| 10,963,462 B2 * | 3/2021 | Sun | G06F 16/2455 |
| 2013/0297197 A1 * | 11/2013 | Zhai | B60W 30/12 701/408 |
| 2017/0011633 A1 * | 1/2017 | Boegel | G08G 1/22 |
| 2017/0225682 A1 * | 8/2017 | Schunk | B60L 5/38 |
| 2019/0220028 A1 | 7/2019 | Anderson | |
| 2020/0057453 A1 * | 2/2020 | Laws | G08G 1/22 |
| 2020/0307691 A1 * | 10/2020 | Kalabic | B62D 15/025 |
| 2020/0385014 A1 * | 12/2020 | Hanniel | B60W 40/072 |
| 2020/0394424 A1 * | 12/2020 | Han | G06V 20/58 |
| 2021/0053571 A1 * | 2/2021 | Nattermann | B60W 30/18163 |
| 2021/0061293 A1 * | 3/2021 | Bacchus | B60W 50/0097 |
| 2021/0101616 A1 * | 4/2021 | Hayat | G06F 18/21 |
| 2022/0332350 A1 * | 10/2022 | Jha | H04W 4/024 |
| 2022/0351526 A1 * | 11/2022 | Bar Zvi | B60W 10/04 |
| 2022/0371594 A1 * | 11/2022 | Raffone | B60W 60/0011 |
| 2022/0379893 A1 * | 12/2022 | Li | B60W 50/0098 |

FOREIGN PATENT DOCUMENTS

| | | |
|---|---|---|
| CN | 110413942 A | 11/2019 |
| CN | 110907193 A | 3/2020 |
| CN | 110987463 A | 4/2020 |
| CN | 111780981 A | 10/2020 |

OTHER PUBLICATIONS

Wei, Kun et al., Synchronous Collection of Rollover Parameter Data of Dangerous Goods Tank Truck, Journal of Highway and Transportation Research and Development, Dec. 31, 2017, pp. 59-63, vol. 34 S2.

Bian Chentong et al., Active Rescue System of Unmanned Vehicle Platoon in Fog Weather, Automotive Engineering, Jan. 31, 2020, pp. 20-26, vol. 42-1.

* cited by examiner

INTELLIGENT VEHICLE PLATOON LANE CHANGE PERFORMANCE EVALUATION METHOD

TECHNICAL FIELD

The present invention relates to the technical field of road trials and testing of intelligent driving vehicles, and in particular, to an intelligent vehicle platoon lane change performance evaluation method.

BACKGROUND

With continuous increase of traffic mileage in our country, explosive growth of vehicle holdings, as well as complex road conditions and traffic conditions in our country, traffic accidents frequently occur, resulting in traffic interruptions, property losses and casualties. More than 90% of road traffic accidents are caused by a driver factor. In this context, an intelligent driving technology that assists a driver in driving operations, partially replaces the driver's operation in emergency situations, or even fully realizes unmanned driving has become the focus of research at home and abroad.

As an important constituent part of the intelligent driving technology, intelligent vehicle platoon uses technologies such as collaborative control and vehicle-to-vehicle communication to organize vehicles traveling in the same direction uniformly, so that vehicles travel in columns with a small fixed distance. When encountering an obstacle, the following vehicles can receive obstacle avoidance information sent by a leading vehicle, and change lanes to avoid roadblocks like the path of leading vehicle. As an advanced mode of road transportation, intelligent vehicle platoon driving plays an important role in improving driving safety, improving road efficiency, alleviating traffic congestion, and reducing fuel consumption. At present, the intelligent vehicle platoon technology is mainly applied to large trucks with heavy loads and large volumes for road transportation. If the platoon vehicles have a traffic accident, it is very likely to cause serious consequences such as multi-vehicle rear-end collisions, group deaths and group injuries. In order to realize safe and efficient intelligent vehicle platoon driving, the test and evaluation of the functions and performance of intelligent vehicle platoons has been highly valued by the government and research institutions.

At present, the existing patent literature studies the test and evaluation of the function and performance of intelligent vehicle platoon, and builds an evaluation system for the platoon effect of intelligent vehicles, involving aspects such as safety and traffic efficiency. In terms of safety evaluation, a hazard analysis and risk evaluation method is utilized to analyze the effectiveness and stability of the platoon, a stochastic model is utilized to evaluate the collision probability of platoon vehicles, or a car-following model such as an Intelligent Driver Model (IDM) and a Cooperative Adaptive Cruise Control (CACC) model is utilized to model the vehicle platoon process, and distance-to-collision time, inverse distance-to-collision time, total time exposed to dangerous traffic conditions, a collision risk index, and velocity covariance and other indexes are utilized for safety evaluation. In terms of traffic efficiency evaluation, the efficiency evaluation is carried out using the intersection traffic flow, exit turning rate, operating velocity, traffic flow and other indexes. There is no evaluation research on the intelligent vehicle platoon lane change performance, especially the lack of evaluation research on quantifying the performance indexes of platoon lane-changing.

On the whole, a quantitative evaluation method and an index evaluation system for the intelligent vehicle platoon lane change performance are not formed, which cannot meet the needs of comprehensive, accurate and reliable quantitative evaluation of vehicle platoon performance, and further breakthroughs are needed.

SUMMARY

Purpose of the Invention

To solve the problem of the lack of quantitative evaluation of platoon lane change performance at present, an intelligent vehicle platoon lane change performance evaluation method is proposed. Based on actual road tests, the method can measure vehicle motion state parameters in a high-precision and comprehensive manner, quantify and output multi-dimensional platoon lane change performance evaluation indexes, and achieve comprehensive, accurate and reliable scientific quantitative evaluation for platoon lane change performance.

Technical Solution

To achieve the purpose of the present invention, the technical solution adopted in the present invention is: an intelligent vehicle platoon lane change performance evaluation method. First, an intelligent vehicle platoon lane change performance test scenario is established; Secondly, a three-degree of freedom nonlinear dynamics model is established according to motion characteristics of intelligent vehicles in a platoon lane change process. Further, an improved adaptive unscented Kalman filter algorithm is utilized to perform filter estimation on state variables of positions and velocities of platoon vehicles. Finally, based on accurately recursive vehicle motion state parameters, evaluation indexes for platoon lane change performance are proposed and quantified, and an evaluation system for platoon lane change performance is constructed, thereby achieving comprehensive, accurate, and reliable scientific quantitative evaluation for intelligent vehicle platoon lane change performance. The method includes the following steps.

Step I, an intelligent vehicle platoon lane change performance test scenario is established.

Regarding the problem of lacking intelligent vehicle platoon lane change performance evaluation at present, the present invention establishes an intelligent vehicle platoon lane change performance test scenario. first, selecting a high-grade highway as a test site, and secondly, establishing an intelligent vehicle platoon lane change performance test scenario, described as follows:

a leading vehicle is located in the middle of a test road and drives in a straight line at a set velocity, and following vehicles follow the leading vehicle at a set interval; when the leading vehicle passes through a test starting point, it is started to synchronously collect motion state parameters of the leading vehicle and the following vehicles; then, when encountering an obstacle, the leading vehicle conducts a lane change operation, the following vehicles receive lane change information and change lanes with a similar motion trajectory; and when the leading vehicle reaches an end point, a test is completed.

In the present invention, the leading vehicle refers to a first vehicle in platoon driving, generally in a manual driving mode, and the following vehicles refer to intelligent vehicles behind the leading vehicle in platoon driving, generally in an automatic driving mode.

Step II, a dynamic model for intelligent vehicle platoon lane change is established.

In the process of platoon lane change performance test, it is necessary to accurately obtain the motion state parameters such as the position and velocity of the leading vehicle and the following vehicles at each moment. In order to meet the measurement requirements of complete information and high precision, it is necessary to establish a dynamic model that can accurately describe the intelligent vehicle platoon lane change movement characteristics. For the field of application of the present invention, for front-wheel steered four-wheel vehicles in platoon driving, the following assumptions are made:

(1) ignoring pitch and roll motions of each vehicle, and ignoring the influence of a vehicle suspension on a tire axle;

(2) assuming that two tires of a front axle of the vehicle have the same steering angle, cornering angle, longitudinal force and lateral force, and assuming that two tires of a rear axle of the vehicle have the same steering angle, cornering angle, longitudinal force and side force to force; and (3) assuming that the direction of the front wheels of the vehicle is consistent with the current velocity direction of the vehicle.

According to the above requirements and assumptions, the present invention adopts the three-degree of freedom model to perform dynamics modeling on the leading vehicle in the platoon vehicles. The three-degree of freedom dynamics model of the vehicle is defined, considering the longitudinal, lateral and yaw motions. Point G is the center of mass of the vehicle. The left and right wheels of the front axle are combined into one point, located at point A. The left and right wheels of the rear axle are combined into one point, located at point B. The GX axis is the same as the vehicle's forward direction, the GY axis is determined by the right-hand screw rule, and the GZ axis is perpendicular to the vehicle motion plane and points to the ground. The dynamics model of the leading vehicle is described as:

$$\begin{cases} \dot{v}_x = v_y \cdot r_l + a_x \\ a_x = \frac{2}{M}[F_{xf}\cos\delta - F_{yf}\sin\delta + F_{xr}] \\ \dot{v}_y = -v_x \cdot r_l + a_y \\ a_y = \frac{2}{M}[F_{yf}\cos\delta + F_{xf}\sin\delta + F_{yr}] \\ \dot{r}_l = \frac{2}{I_z}[l_f F_{xf}\sin\delta + l_f F_{yf}\cos\delta - l_r F_{yr}] \end{cases} \quad (1)$$

In formula (1), the superscript "⌴" represents the differential; $\dot{v}_x$ represents the differential of $v_x$; $r_l$, $v_x$, $v_y$, $a_x$, and $a_y$ represent the yaw angular velocity, longitudinal velocity, lateral velocity, longitudinal acceleration and lateral acceleration of the leading vehicle, respectively; M, δ, and $I_z$ represent the mass of the leading vehicle, a steering angle of the front wheel, and the moment of inertia around the vertical axis of a body coordinate system, respectively, $l_f$ and $l_r$ represent the distances from the center of mass of the vehicle to the front and rear axles, respectively, $F_{xf}$, $F_{xr}$, $F_{yf}$, and $F_{yr}$ represent the longitudinal force and lateral force on the front and rear wheels, respectively.

For vehicles running on general roads, when the tire cornering angle is small, the lateral force on the front and rear tires is represented as:

$$F_{yf} = C_{\alpha f} \cdot \alpha_f, F_{yr} = C_{\alpha r} \cdot \alpha_r \quad (2).$$

In formula (2), $C_{\alpha f}$ and $C_{\alpha r}$ represent the cornering stiffness of the front and rear tires, respectively, $\alpha_f$ and $\alpha_r$ represent the cornering angle of the front and rear tires, respectively, and $\alpha_f = \delta - (v_y + l_f r)/v_x$, $\alpha_r = (l_r r - v_y)/v_x$.

In order to calculate the tire longitudinal force in formula (2), the tire model can be adopted to determine. Common tire models include empirical models, theoretical models, and adaptive models. In order to ensure the accuracy and real-time performance of vehicle motion parameter measurement, the present invention adopts a brush tire model, and the longitudinal force of the front and rear tires is represented as:

$$F_{xf} = C_{xf} s_{xf} + \frac{(C_{xf} s_{xf})^3}{27(\mu_l F_{zf})^2} - \frac{(C_{xf} s_{xf})^2}{3\mu_l F_{zf}} \quad (3)$$

$$F_{xr} = C_{xr} s_{xr} + \frac{(C_{xr} s_{xr})^3}{27(\mu_l F_{zr})^2} - \frac{(C_{xr} s_{xr})^2}{3\mu_l F_{zr}}.$$

In formula (3), $C_{xf}$ and $C_{xr}$ represent the longitudinal stiffness of the front and rear tires, respectively, $\mu_l$ is a road adhesion coefficient, considering that the test road for the platoon lane change test is generally a dry and smooth asphalt road. The present invention takes that $\mu_l = 0.75$, the vertical loads $F_{zf}$ and $F_{zr}$ of the front and rear tires, the longitudinal slip rates $s_{xf}$ and $s_{xr}$ of the front and rear tires are calculated by the following formulas:

$$F_{zf} = \frac{9.8 M l_r}{(l_f + l_r)} \quad F_{zr} = \frac{9.8 M l_f}{(l_f + l_r)} \quad (4)$$

$$s_{xf} = \frac{\omega_f R_{tyre} - v_{xf}}{\max(\omega_f R_{tyre}, v_{xf})} \quad s_{xr} = \frac{\omega_r R_{tyre} - v_{xr}}{\max(\omega_r R_{tyre}, v_{xr})}. \quad (5)$$

In the formulas, $R_{tyre}$ is the tire radius, $\omega_f$ and $\omega_r$ represent the rotational angular velocity of the front and rear wheels, respectively, obtained by calculating a linear velocity measured by a wheel velocity sensor, $v_{xf}$ and $v_{xr}$ represent the velocities of the front and rear axles along the tire direction, respectively, and $v_{xr} = v_x$, and $v_{xf} = v_x \cos \delta + (v_y + l_f r_l) \sin \delta$.

At the same time, the longitudinal and lateral velocities $v_x$ and $v_y$ of the vehicle, and the east and north positions $p_e$ and $p_n$ satisfy the following relationship:

$$\dot{p}_e = v_e = \sqrt{v_x^2 + v_y^2} \sin\beta \dot{p}_n = v_n = \sqrt{v_x^2 + v_y^2} \cos\beta \quad (6).$$

In formula (6), $v_e$ and $v_n$ represent the east and north velocities of the vehicle, respectively, and β represents the azimuth of the vehicle's motion direction relative to the due north direction, and the following relationship is satisfied:

$$\beta = \begin{cases} \text{when } \arctan(v_e/v_n) & v_n > 0 \\ \text{when } \arctan(v_e/v_n) - \pi & v_n < 0, v_e < 0 \\ \text{when } \arctan(v_e/v_n) + \pi & v_n < 0, v_e > 0 \\ \text{when } \pi/2 & v_n = 0, v_e > 0 \\ \text{when } -\pi/2 & v_n = 0, v_e < 0 \text{ and} \\ 0 & v_n = v_e = 0 \end{cases}.$$

For the intelligent vehicle platoon lane change process, taking a system state vector $X = [p_e \ p_n \ v_x \ v_y \ r_l]^T$, the superscript T of the matrix in the present invention represents the transposition of the matrix, and T represents the discrete period. According to the dynamics model described by formula (1), the system state equation is established:

$$X = f(X, U, W, \gamma) \quad (7).$$

In formula (7), f($\square$) is a 5-dimensional vector function, W is the zero-mean system Gaussian white noise, $\gamma$ is the zero-mean Gaussian white noise corresponding to the external input of the system, U is an external input vector of the system and U=$[\delta\ F_{xf}\ F_{sr}]^T$, where a steering angle of the front wheel is $\delta=\varepsilon_l/\rho_l$, the steering wheel angle $\varepsilon_l$ is obtained by a body CAN bus, $\rho_l$ is a transmission ratio of the steering system, and in the present invention, $\rho_l=10$, the tire longitudinal forces $F_{xf}$ and $F_{sr}$ are determined by the brush tire model.

Step III, vehicle motion state estimation based on an improved unscented Kalman filter algorithm The present invention adopts a UKF algorithm to perform recursive estimation on the vehicle motion state parameters.

The observation equation of the system is represented as:

$$Z(t)=h(x(t),V(t)) \qquad (8).$$

In formula (8), h is the observation equation, t is the time, and the system observation vector Z=$[p_{eg}\ p_{ng}\ v_{x\_m}\ \omega_{z\_m}]^T$, where $p_{eg}$ and $p_{ng}$ represent the observed values of the east and north positions of the vehicle, respectively, and are obtained by converting the latitude and longitude coordinates collected by a centimeter-level high-precision satellite positioning system (such as GPS and Beidou); and $v_{x\_m}$ and $\omega_{z\_m}$ represent the longitudinal forward velocity and yaw angular velocity of the vehicle, respectively, and are measured by an inertial measurement unit.

In the actual filtering recursion process, it is necessary to adopt a discretized filtering model. To this end, discretization is performed on formulas (7) and (8), and the system state equation and observation equation after discretization are respectively:

$$\begin{cases} X(k) = f(X(k-1),\ U(k-1),\ W(k-1),\ \gamma(k-1)) \\ Z(k) = h(X(k),\ V(k)) \end{cases} \qquad (9)$$

In formula (9), k is the discretization time, and the system process noise W=$[w_1\ w_2\ w_3\ w_4\ w_5]^T$, where $w_1$, $w_2$, $w_3$, $w_4$, and $w_5$ represent five system Gaussian white noise components, respectively, a Gaussian white noise covariance matrix corresponding to W(k−1) is Q(k−1)=$\mathrm{diag}[\sigma_{w_1}^2\ \sigma_{w_2}^2\ \sigma_{w_3}^2\ \sigma_{w_4}^2\ \sigma_{w_5}^2]$, where $\sigma_{w_1}^2$, $\sigma_{w_2}^2$, $\sigma_{w_3}^2$, $\sigma_{w_4}^2$, and $\sigma_{w_5}^2$ represent the variances corresponding to Gaussian white noises $w_1$, $w_2$, $w_3$, $w_4$, and $w_5$, respectively. The system observation noise V=$[v_1\ v_2\ v_3\ v_4]^T$, where $v_1$, $v_2$, $v_3$, and $v_4$ represent four system Gaussian white noise components, respectively, a measured white Gaussian noise covariance matrix corresponding to V(k) is R(k)=$\mathrm{diag}[\sigma_{v_1}^2\ \sigma_{v_2}^2\ \sigma_{v_3}^2\ \sigma_{v_4}^2]$, where $\sigma_{v_1}^2$, $\sigma_{v_2}^2$, $\sigma_{v_3}^2$, and $\sigma_{v_4}^2$ respectively represent the variances corresponding to the Gaussian white noises $v_1$, $v_2$, $v_3$, and $v_4$, and are determined according to the statistical characteristics of the measurement noise of the sensor's position, velocity, and yaw angular velocity. The external input noise of the system is $\gamma=[w_\delta\ w_{F_{xf}}\ w_{F_{sr}}]^T$, where $w_\delta$, $w_{F_{xf}}$, and $w_{F_{sr}}$ represent the zero-mean Gaussian white noise components corresponding to $\delta$, $F_{xf}$, and $F_{sr}$, respectively, and these white noises are implied in the three external inputs of the system of the system state function f. The system state function is:

$$f(X, U, W, \gamma) = \begin{bmatrix} f_1(X(k-1),\ U(k-1),\ W(k-1),\ \gamma(k-1)) \\ f_2(X(k-1),\ U(k-1),\ W(k-1),\ \gamma(k-1)) \\ f_3(X(k-1),\ U(k-1),\ W(k-1),\ \gamma(k-1)) \\ f_4(X(k-1),\ U(k-1),\ W(k-1),\ \gamma(k-1)) \\ f_5(X(k-1),\ U(k-1),\ W(k-1),\ \gamma(k-1)) \end{bmatrix}$$

where, $$f_1(X(k-1),\ U(k-1),\ W(k-1),\ \gamma(k-1)) = p_e(k-1) + \sqrt{v_x^2(k-1) + v_y^2(k-1)}\sin\beta \cdot T + w_1$$

$$f_2(X(k-1),\ U(k-1),\ W(k-1),\ \gamma(k-1)) = p_n(k-1) + \sqrt{v_x^2(k-1) + v_y^2(k-1)}\cos\beta \cdot T + w_2$$

$$f_3(X(k-1),\ U(k-1),\ W(k-1),\ \gamma(k-1)) = v_x(k-1) + \frac{T}{M}\left[Mv_y(k-1)r_l(k-1) + 2C_{\alpha f}\frac{v_y(k-1)+l_f r_l(k-1)}{v_x(k-1)}\delta(k-1)\right] + \frac{2T}{M}[F_{xf}(k-1) + F_{xr}(k-1)] + w_3$$

$$f_4(X(k-1),\ U(k-1),\ W(k-1),\ \gamma(k-1)) = v_y(k-1) + \frac{T}{M}\left[-Mv_x(k-1)r_l(k-1) + 2C_{\alpha f}\delta(k-1) - 2C_{\alpha f}\frac{v_y(k-1)+l_f r_l(k-1)}{v_x(k-1)} + 2C_{\alpha r}\frac{l_r r_l(k-1) - v_y(k-1)}{v_x(k-1)}\right] + \frac{2T}{M}F_{xf}(k-1)\delta(k-1) + w_4$$

$$f_5(X(k-1),\ U(k-1),\ W(k-1),\ \gamma(k-1)) = r_l(k-1) + \frac{T}{I_z}\left[2l_f C_{\alpha f}\delta(k-1) - 2l_f C_{\alpha f}\frac{v_y(k-1)+l_f r_l(k-1)}{v_x(k-1)} - 2l_r C_{\alpha r}\frac{l_r r_l(k-1) - v_y(k-1)}{v_x(k-1)}\right] + \frac{2l_f T}{I_z}F_{xf}(k-1)\delta(k-1) + w_5.$$

Secondly, according to the system state equation and observation equation described by formula (9), the unscented Kalman filtering recursive process is established, and the filtering recursion is performed by using time update and measurement update:

(1) initializing the input variable and performing parameter calculation $$\begin{cases} \hat{X}_0 = E[X_0] \\ P_0 = E[(X_0 - \hat{X}_0)\cdot(X_0 - \hat{X}_0)^T] \end{cases} \qquad (10)$$

In formula (10), $P_0$ is an initial error variance matrix, the variable with the superscript symbol ˆ represents a filtering estimated value of the variable, and $\hat{X}_0$ is a filtering estimated value representing the initial value $X_0$ of the input variable.

(2) State Estimation $$\begin{cases} \xi_i(k-1) = \hat{X}(k-1),\ i = 0 \\ \xi_i(k-1) = \hat{X}(k-1) + \left(\sqrt{(x_{dim}+\lambda)P(k-1)}\right)_i, \\ \qquad i = 1, 2, \ldots, x_{dim} \\ \xi_i(k-1) = \hat{X}(k-1) - \left(\sqrt{(x_{dim}+\lambda)P(k-1)}\right)_i, \\ \qquad i = x_{dim}+1, x_{dim}+2, \ldots, 2x_{dim} \end{cases} \qquad (11)$$

In formula $\xi_i(k-1)$ is the Sigma point, $(\sqrt{(x_{dim}+\lambda)P(k-1)})_i$ is the i-th column of a square root of a weighted covariance matrix, and $x_{dim}$ is the number of dimensions of the state vector. The present invention takes $x_{dim}=5$.

$$\begin{cases} \omega_0^{(e)} = \dfrac{\lambda}{x_{dim}+\lambda} \\ \omega_0^{(c)} = \omega_0^{(e)} + (1-\alpha^2+\varepsilon) \\ \omega_i^{(c)} = \omega_i^{(e)} = \dfrac{1}{2(x_{dim}+\lambda)} \end{cases} \quad (12)$$

In formula (12), $\lambda$ is a distance parameter, and $\lambda = x_{dim}$ ($\alpha^2-1$), $\alpha$ is a first scale factor, $\varepsilon$ is a second scale factor, taking $\varepsilon=2$, $\omega_i^{(c)}$ and $\omega_i^{(e)}$ represent the weight coefficients of the mean and variance, respectively.

(3) Time Update $$\xi_i(k,k-1)=f[\xi_i(k,k-1)], i=0,1,\ldots,2x_{dim} \quad (13)$$

$$\hat{X}(k,k-1)=\Sigma_{i=0}^{2xdim}\omega_i^{(e)}\xi_i(k,k-1) \quad (14)$$

$$P(k,k-1)=\Sigma_{i=0}^{2xdim}\omega_i^{(c)}[\xi_i(k,k-1)-\hat{X}(k,k-1)]\cdot[\xi_i(k,k-1)-\hat{X}(k,k-1)]^T+Q(k) \quad (15)$$

In the formulas, $\hat{X}(k-1)$ is the optimal estimate at time $k-1$, and $P(k,k-1)$ is a one-step prediction error variance matrix at time k.

(4) Observation Update $$\chi_i(k,k-1)=h[\xi_i(k,k-1)] \quad (16)$$

$$\hat{Z}(k,k-1)=\Sigma_{i=0}^{2xdim}\omega_i^{(e)}\chi_i(k,k-1) \quad (17)$$

$$P_{\tilde{Z}}=\Sigma_{i=0}^{2xdim}\omega_i^{(c)}[\chi_i(k,k-1)-\hat{Z}(k,k-1)][\chi_i(k,k-1)-\hat{Z}(k,k-1)]^T+R(k) \quad (18)$$

$$P_{XZ}=\Sigma_{i=0}^{2xdim}\omega_i^{(c)}[\xi_i(k,k-1)-\hat{X}(k,k-1)][\chi_i(k,k-1)-\hat{Z}(k,k-1)]^T \quad (19)$$

In the formulas, $\chi_i(k,k-1)$ represents the value of the observation equation transformed from the Sigma point set, $\hat{Z}(k,k-1)$ represents the one-step predicted observation value at time k recursively from time $k-1$, $P_{\tilde{Z}}$ is the predicted value covariance, and $P_{XZ}$ is the covariance of the state value and the measured value.

(5) Filter Update $$K(k)=P_{XZ}\cdot P_{\tilde{Z}}^{-1} \quad (20)$$

$$\hat{X}(k)=\hat{X}(k,k-1)+K(k)\cdot[Z(k)-\hat{Z}(k,k-1)] \quad (21)$$

$$P(k)=P(k,k-1)-K(k)\cdot P_{\tilde{Z}}\cdot K(k)^T \quad (22)$$

In the formulas, $K(k)$ is a filter gain matrix, $\hat{X}(k)$ is a state quantity estimated value, and $P(k)$ is an estimated error variance matrix.

In the actual test process, there are differences in the motion characteristics of different platoon vehicles, so that the noise statistical characteristics of the system cannot be consistent. When dealing with nonlinear problems, although the UKF algorithm has good parameter estimation accuracy, it still has certain shortcomings, that is, the prior statistical characteristics of system observation noise and process noise need to be accurately known.

Regarding the above problems, the present invention combines an AKF filter with an UKF filter, and makes targeted improvements to improve the accuracy of the system state estimation. Specifically:

(1) In order to reduce the influence of the system observation noise and process noise uncertainty on the filtering accuracy, a noise estimator with time-varying performance is introduced. (2) In order to improve the accuracy of the one-step prediction error variance matrix, and formulas (14-15) and formulas (17-18) are replaced with formulas (23-26):

$$\hat{X}(k,k-1)=\Sigma_{i=0}^{2xdim}\omega_i^{(e)}\xi_i(k,k-1)+\hat{q}(k-1) \quad (23)$$

$$P(k,k-1)=\tau_f\Sigma_{i=0}^{2xdim}\omega_i^{(c)}[\xi_i(k,k-1)-\hat{X}(k,k-1)][\xi_i(k,k-1)-\hat{X}(k,k-1)]^T+\hat{Q}(k) \quad (24)$$

$$\hat{Z}(k,k-1)=\Sigma_{i=0}^{2xdim}\omega_i^{(e)}\chi_i(k,k-1)+\hat{r}(k) \quad (25)$$

$$P_{\tilde{Z}}=\Sigma_{i=0}^{2xdim}\omega_i^{(c)}[\chi_i(k,k-1)-\hat{Z}(k,k-1)][\chi_i(k,k-1)-\hat{Z}(k,k-1)]^T+\hat{R}(k) \quad (26)$$

where the means and variance matrixes of the observation noise and system noise $\hat{r}(k)$, $\hat{R}(k)$, $\hat{q}(k)$, $\hat{Q}(k)$, and forgetting factors are:

$$\begin{cases} \hat{q}(k) = \delta_d(k)\Big[\hat{X}(k) - \sum_{k=0}^{2x_{dim}}\omega_i^{(e)}\xi_i(k,k-1)\Big] + [1-\delta_d(k)]\hat{q}(k-1) \\ \hat{Q}(k) = \delta_d(k)\Big\{K(k)\Big[Z(k) - \sum_{k=0}^{2x_{dim}}\omega_i^{(e)}\chi_i(k,k-1)\Big] \\ \quad \Big[Z(k) - \sum_{k=0}^{2x_{dim}}\omega_i^{(e)}\chi_i(k,k-1)\Big]^T K^T(k) + \\ \quad P(k) - \sum_{k=0}^{2x_{dim}}\omega_i^{(c)}\Big[\xi_i(k,k-1) - \hat{X}(k,k-1)\Big] \\ \quad \Big[\xi_i(k,k-1) - \hat{X}(k,k-1)\Big]^T\Big\} + [1-\delta_d(k)]\hat{Q}(k-1) \\ \hat{r}(k) = [1-\delta_d(k)]\hat{r}(k-1) + \delta_d(k)\Big[Z(k) - \sum_{k=0}^{2x_{dim}}\omega_i^{(e)}\chi_i(k,k-1)\Big] \\ \hat{R}(k) = \delta_d(k)\Big\{\Big[Z(k) - \sum_{k=0}^{2x_{dim}}\omega_i^{(e)}\chi_i(k,k-1)\Big] \\ \quad \Big[Z(k) - \sum_{k=0}^{2x_{dim}}\omega_i^{(e)}\chi_i(k,k-1)\Big]^T - \sum_{k=0}^{2x_{dim}}\omega_i^{(c)}[\chi_i(k,k-1) - \\ \quad \hat{Z}(k,k-1)][\chi_i(k,k-1) - \hat{Z}(k,k-1)]^T\Big\} + [1-\delta_d(k)]\hat{R}(k-1) \end{cases} \quad (27)$$

$$\tau_f = \max\left\{1, \dfrac{\text{trace}(P_{\tilde{Z}}P_{\tilde{Z}}^T)}{\text{trace}\left\{[x_i(k,k-1)-\hat{Z}(k,k-1)][x_i(k,k-1)-\hat{Z}(k,k-1)]^T\right\}}\right\} \quad (28)$$

In the formulas, $\delta_d(k)$ represents an adaptive weighting parameter at time k, and $\delta_d(k)=1/k$, $\tau_f$ is the forgetting factor.

In conclusion, formulas (10-13), formula (16), and formulas (19-28) constitute the improved adaptive unscented Kalman filter algorithm.

Finally, after the above-mentioned improved filtering recursive calculation, the output state estimate $\hat{X}(k)$ is the east position, north position, longitudinal velocity, lateral velocity and yaw angular velocity information of the leading vehicle at time k.

Similarly, the dynamics model of each following vehicle is established by using the method described in step II and step III, and filtering recursion is performed, to output the motion state parameters of each following vehicle.

For the intelligent vehicles in the platoon, the output longitudinal velocity information is $V_{x\_j}=\{v_{x\_j}(0), v_{x\_j}(1), \ldots, v_{x\_j}(k)\}$, the lateral velocity information is $V_{y\_j}=\{v_{y\_j}(0), v_{y\_j}(1), \ldots, v_{y\_j}(k)\}$, the yaw angular velocity information is $R_j=\{r_{L\_j}(0), r_{L\_j}(1), \ldots, r_{L\_j}(k)\}$, and the position information is $P_j=\{(p_{e\_j}(0), p_{n\_j}(0)), (p_{e\_j}(1), p_{n\_j}(1)), \ldots, (p_{e\_j}(k), p_{n\_j}(k)), (j=1, 2, 3 \ldots, a)$.

The subscript j represents the j-th platoon vehicle in the platoon, for example, j=1 represents that the vehicle is the leading vehicle, and j=2 represents that the vehicle is the first following vehicle, a is the total number of platoon vehicles, $p_{e\_j}(k)$, $p_{n\_j}(k)$, $v_{x\_j}(k)$, $v_{y\_j}(k)$, and $r_{L\_j}(k)$ represent the east position, the north position, the longitudinal velocity, the lateral velocity and the yaw angular velocity of the j-th intelligent vehicle at time k, respectively.

Step IV, the evaluation indexes for platoon lane change performance are proposed and quantified.

Regarding the following vehicles in the platoon driving, first, the present invention proposes multi-dimensional platoon lane change performance evaluation indexes: lane change yaw stability, velocity consistency, safety distance margin, and average vehicle clearance. Secondly, based on the position and velocity motion state parameters of the leading vehicle and the following vehicles output in step II, the above performance evaluation indexes are quantified. Specifically:

(1) Lane Change Yaw Stability $$\sigma_j = \sqrt{\frac{1}{s}\sum_{k=1}^{s}[r_j(k) - r_{E\_j}(k)]^2}. \qquad (29)$$

In formula (29), $\sigma_j$ represents the lane change yaw stability of the j-th following vehicle, which reflects the aggressiveness of the following vehicle to change lanes, $r_{E\_j}(k)$ is an expected value of the yaw angular velocity at time k, and $r_{E\_j}(k) = \sqrt{v_{x\_j}^2(k) + v_{y\_j}^2(k)}/R_{road}$, the unit is rad/s, $R_{road}$ is the radius of curvature of the road, calculated from the position and velocity information output in step III, and s is the number of sampling points in the test process.

(2) Velocity Consistency $$\tau_{platoon} = \frac{1}{j-1}\sum \tau_j. \qquad (30)$$

In formula (30), $\tau_{platoon}$ represents the velocity consistency in the platoon lane change process, $\tau_j$ represents the average relative velocity of the j-th following vehicle and the vehicle ahead in the same direction, and $$\tau_j = \frac{1}{s}\sum_{k=1}^{s}[v_{res\_j}(k) - v_{res\_j-1}(k)],$$

$v_{res\_j}(k)$ is the combined velocity of the j-th following vehicle at time k, in m/s.

(3) Safety Distance Margin $$L_j = \sqrt{[p_{e\_j}(k) - p_{e\_j-1}(k)]^2 + [p_{n\_j}(k) - p_{n\_j-1}(k)]^2} - L_v. \qquad (31)$$

In formula (31), $L_j$ represents the safety distance margin between the j-th following vehicle and the vehicle ahead in the same direction, and $L_v$ is the body length of the following vehicle, and the unit is m.

(4) Average Vehicle Clearance $$L_{avg} = \frac{1}{j-1}\sum L_j. \qquad (32)$$

In formula (32), $L_{avg}$ is the average value of the platoon vehicle clearance, and the unit is m.

In evaluation of the intelligent vehicle platoon lane change performance, first, in the test scenario constructed in "step I", "step II" and "step III" are utilized to perform filtering recursion on each motion state parameter of the leading vehicle and the following vehicles. Secondly, according to "step IV", the quantitative values of the performance evaluation indexes are calculated. Finally, the lane change performance of the platoon vehicles is analyzed by quantitative evaluation, achieving comprehensive, accurate, and reliable scientific quantitative evaluation for intelligent vehicle platoon lane change performance.

Beneficial effects: compared with the prior art, the technical solution of the present invention has the following beneficial technical effects:

1) Through the test method proposed by the present invention and the constructed platoon lane change performance evaluation system, the current problem of lack of quantitative evaluation of platoon lane change performance is solved, and a comprehensive and reliable scientific quantitative evaluation of intelligent vehicle platoon lane change performance is achieved.

2) Compared with the evaluation method of virtual simulation, the platoon lane change performance evaluation method based on an actual road test proposed by the present invention can better ensure the safety and reliability of the platoon lane change of the intelligent vehicles, and is more accurate and persuasive.

3) The measurement accuracy of vehicle motion state parameters and platoon lane change performance indexes is high, and the position measurement accuracy is less than or equal to 0.0295 m (RMS), and the accuracy can meet the high-precision test requirements of platoon lane change performance.

4) The environmental adaptability is high, under complex conditions such as wet and slippery roads, nights and rainy days, the method proposed by the present invention can complete the platoon lane change performance test with the same accuracy as the dry road surface.

DETAILED DESCRIPTION

Figure 1:
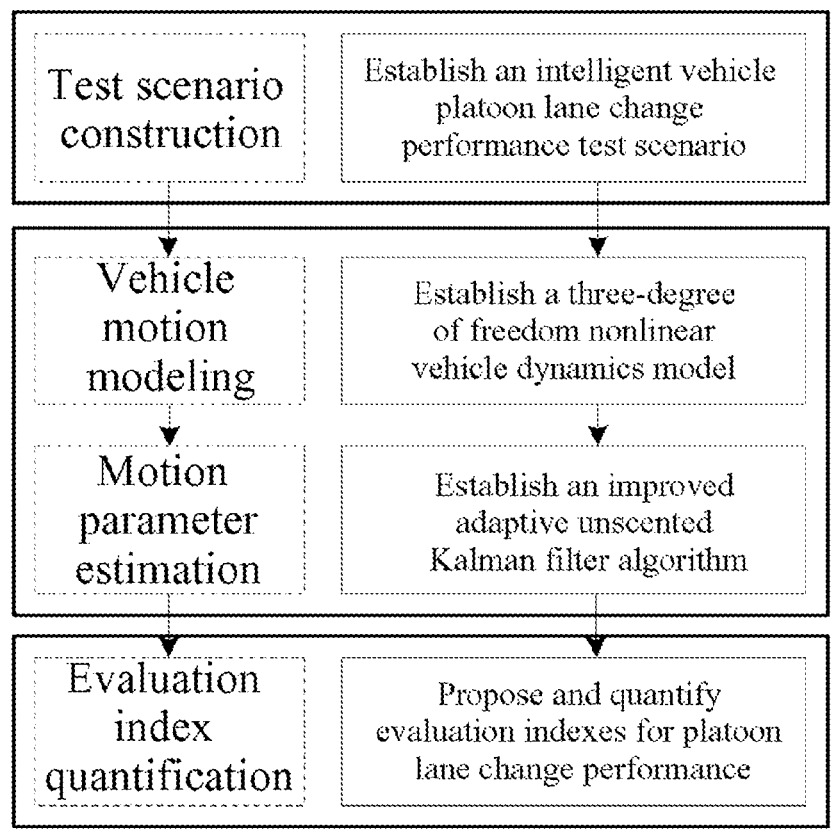
FIG. 1 is a schematic diagram of a technical route of the present invention.

The technical solution of the present invention is further described below with reference to the accompanying drawings and embodiments.

With the continuous increase of traffic mileage in our country and the explosive growth of vehicle holdings, together with the complex road conditions and traffic conditions in our country, traffic accidents frequently occur, resulting in traffic interruptions, property losses and casualties. More than 90% of road traffic accidents are caused by drivers. In this context, the intelligent driving technology that assists the driver in driving operations, partially replaces the driver's operation in emergency situations, or even fully realizes unmanned driving has become the focus of research at home and abroad.

As an important part of intelligent driving technology, intelligent vehicle platoon uses technologies such as collaborative control and vehicle-to-vehicle communication to organize vehicles traveling in the same direction uniformly, so that vehicles travel in columns with a small fixed distance. When encountering an obstacle, the following vehicle can receive lane change information sent by a leading vehicle, and change lanes to avoid roadblocks like the path of leading vehicle. As an advanced mode of road transportation, intelligent vehicle platoon driving plays an important role in improving driving safety, improving road efficiency, alleviating traffic congestion, and reducing fuel consumption. At present, the intelligent vehicle platoon technology is mainly applied to large trucks with heavy loads and large volumes for road transportation. If the platoon vehicles have a traffic accident, it is very likely to cause serious consequences such as multi-vehicle rear-end collisions, group deaths and group injuries. In order to realize safe and efficient intelligent vehicle platoon driving, the test and evaluation of the functions and performance of intelligent vehicle platoons has been highly valued by the government and research institutions.

To this end, our country has formulated a series of standards and regulations to test and evaluate the performance of intelligent vehicle platoons. The National Ministry of Industry and Information Technology, the Ministry of Public Security, and the Ministry of Communications jointly issue the "AUTONOMOUS DRIVING FUNCTION TEST REGULATIONS FOR INTELLIGENT CONNECTED VEHICLES", which clearly stipulates the test scenarios and test methods for intelligent vehicle platoons. Lane changing is one of the most common and complex actions in platoon driving, and the performance thereof is particularly important for realizing safe and efficient vehicle platoon. However, this standard only conducts functional tests for platoon driving and platoon switching in intelligent vehicle platoons, and does not relate to the test and evaluation of platoon lane-changing performance. The Guangzhou Municipal Transportation Commission issues the "GUIDING OPINIONS ON THE WORK RELATED TO THE ROAD TEST OF INTELLIGENT CONNECTED VEHICLES", which makes clear requirements for the test vehicles, test conditions and test environment in the platoon driving test, but does not relate to the specific test methods and test procedures for platoon driving functions and performance. China Transportation Intelligent Transportation Industry Alliance issues the T/ITS0101-2019 standard "AUTONOMOUS DRIVING COMMERCIAL VEHICLE TEST SITE CONSTRUCTION AND AUTOMATED TEST SPECIFICATIONS", which describes the test methods and evaluation criteria for the platoon driving ability of commercial vehicles. However, this standard only tests and evaluates the safety during platoon driving, and does not quantitatively evaluate the lane-changing performance during platoon driving. It can be seen that there is still lack of perfect evaluation methods and unified national standards for the quantitative test and evaluation of the lane-changing performance of intelligent vehicles.

At present, the existing patent literature studies the test and evaluation of the function and performance of intelligent vehicle platoon, and builds an evaluation system for the platoon effect of intelligent vehicles, involving aspects such as safety and traffic efficiency. In terms of safety evaluation, a hazard analysis and risk evaluation method is utilized to analyze the effectiveness and stability of the platoon, a stochastic model is utilized to evaluate the collision probability of platoon vehicles, or a car-following model such as an Intelligent Driver Model (IDM) and a Cooperative Adaptive Cruise Control (CACC) model is utilized to model the vehicle platoon process, and distance-to-collision time, inverse distance-to-collision time, total time exposed to dangerous traffic conditions, a collision risk index, and velocity covariance and other indexes are utilized for safety evaluation. In terms of traffic efficiency evaluation, the efficiency evaluation is carried out using the intersection traffic flow, exit turning rate, operating velocity, traffic flow and other indexes. There is no evaluation research on the intelligent vehicle platoon lane change performance, especially the lack of evaluation research on quantifying the performance indexes of platoon lane-changing.

On the whole, a quantitative evaluation method and an index evaluation system for the intelligent vehicle platoon lane change performance are not formed, which cannot meet the needs of comprehensive, accurate and reliable quantitative evaluation of vehicle platoon performance, and further breakthroughs are needed.

In order to comprehensively and accurately obtain vehicle motion parameters in the process of intelligent vehicle platoon lane change, multi-dimensional platoon lane change performance evaluation indexes are quantified and output, and comprehensive, accurate, and reliable scientific quantitative evaluation for platoon lane change performance is achieved, to fill a gap in the intelligent vehicle platoon lane change performance evaluation technology in practical applications. The present invention proposes an intelligent vehicle platoon lane change performance evaluation method for large trucks traveling in platoon. First, an intelligent vehicle platoon lane change performance test scenario is established. Secondly, a three-degree of freedom nonlinear dynamics model is established according to motion characteristics of intelligent vehicles in a platoon lane change process. Further, an improved adaptive unscented Kalman filter algorithm is utilized to perform filter estimation on state variables of positions and velocities of platoon vehicles. Finally, based on accurately recursive vehicle motion state parameters, evaluation indexes for platoon lane change performance are proposed and quantified, and an evaluation system for platoon lane change performance is constructed, thereby achieving comprehensive, accurate, and reliable scientific quantitative evaluation for intelligent vehicle platoon lane change performance. The technical route of the present invention is as shown in FIG. 1, and the concrete steps are as follows:

Step I, an intelligent vehicle platoon lane change performance test scenario is established. For the current lack of intelligent vehicle platoon lane change performance evaluation, the present invention establishes an intelligent vehicle platoon lane change performance test scenario. First, a high-grade highway is selected as the test site, and secondly, an intelligent vehicle platoon lane change performance test scenario is established. The detailed description is as follows: the leading vehicle is located in the middle of the test road and drives straight at a set velocity, the following vehicles follow the leading vehicle at a set distance, and when the leading vehicle passes through the test starting point, it is started to collect the motion state parameters of the leading vehicle and the following vehicles synchronously. Then, when encountering an obstacle, the leading vehicle conducts a lane change operation, the following vehicles receive lane change information and change lanes with a similar motion trajectory. When the leading vehicle reaches an end point, a test is completed.

In the present invention, the leading vehicle refers to a first vehicle in platoon driving, generally in a manual driving mode, and the following vehicles refer to intelligent vehicles behind the leading vehicle in platoon driving, generally in an automatic driving mode.

Step II, a dynamic model for intelligent vehicle platoon lane change is established.

In the process of platoon lane change performance test, it is necessary to accurately obtain the motion state parameters such as the position and velocity of the leading vehicle and the following vehicles at each moment. In order to meet the measurement requirements of complete information and high precision, it is necessary to establish a dynamic model that can accurately describe the intelligent vehicle platoon lane change movement characteristics. For the field of application of the present invention, for front-wheel steered four-wheel vehicles in platoon driving, the following assumptions are made:

(1) ignoring pitch and roll motions of each vehicle, and ignoring the influence of a vehicle suspension on a tire axle;

(2) assuming that two tires of a front axle of the vehicle have the same steering angle, cornering angle, longitudinal force and lateral force, and assuming that two tires of a rear axle of the vehicle have the same steering angle, cornering angle, longitudinal force and side force to force; and (3) assuming that the direction of the front wheels of the vehicle is consistent with the current velocity direction of the vehicle.

Compared with the vehicle kinematics model, the dynamics model can describe the vehicle platoon lane change process in a more refined manner. Therefore, according to the above requirements and assumptions, the dynamics modelling of the large trucks traveling in platoon is carried out. Due to the complexity of the dynamics model of the truck, some parameters involved are difficult to obtain, and need to be simplified appropriately. Considering that the single-degree of freedom and two-degree of freedom dynamics models are too simple, the influence of factors such as the nonlinear characteristics of tires on vehicle motion is ignored, and the vehicle motion characteristics in the process of platoon lane change cannot be accurately described. Therefore, under the condition of taking into account the model accuracy and parameter complexity, the present invention adopts a three-degree of freedom model to carry out dynamics modeling of the leading vehicle in the platoon vehicle.

Figure 2:
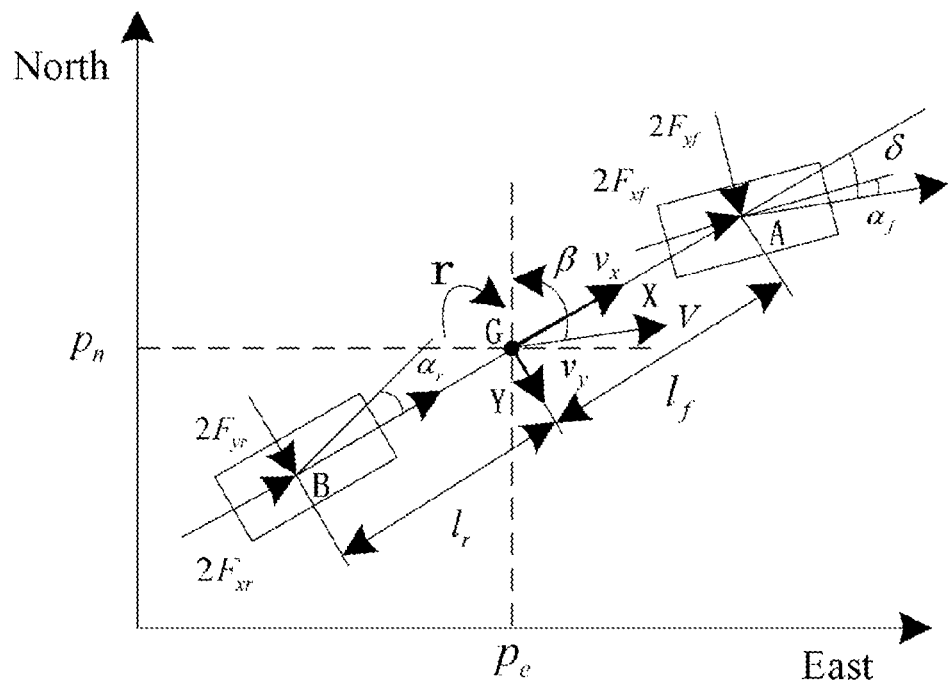
FIG. 2 is a schematic diagram of a dynamics model of platoon vehicles.

FIG. 2 defines a three-degree of freedom dynamics model of the vehicle, considering the longitudinal, lateral and yaw motions. Point G is the center of mass of the vehicle. The left and right wheels of the front axle are combined into one point, located at point A. The left and right wheels of the rear axle are combined into one point, located at point B. The GX axis is the same as the vehicle's forward direction, the GY axis is determined by the right-hand screw rule, and the GZ axis is perpendicular to the vehicle motion plane and points to the ground. According to FIG. 2, the dynamics model of the leading vehicle is described as:

$$\begin{cases} \dot{v}_x = v_y \cdot r_l + a_x \\ a_x = \frac{2}{M}[F_{xf}\cos\delta - F_{yf}\sin\delta + F_{xr}] \\ \dot{v}_y = -v_x \cdot r_l + a_y \\ a_y = \frac{2}{M}[F_{yf}\cos\delta + F_{xf}\sin\delta + F_{yr}] \\ \dot{r}_l = \frac{2}{I_z}[l_f F_{xf}\sin\delta + l_f F_{yf}\cos\delta - l_r F_{yr}] \end{cases} \quad (1)$$

In formula (1), the superscript "⌐" represents the differential; $\dot{v}_x$ represents the differential of $v_x$; $r_l$, $v_x$, $v_y$, $a_x$, and $a_y$ represent the yaw angular velocity, longitudinal velocity, lateral velocity, longitudinal acceleration and lateral acceleration of the leading vehicle, respectively; M, δ, and $I_z$ represent the mass of the leading vehicle, a steering angle of the front wheel, and the moment of inertia around the vertical axis of a body coordinate system, respectively, $l_f$ and $l_r$ represent the distances from the center of mass of the vehicle to the front and rear axles, respectively, $F_{xf}$, $F_{xr}$, $F_{yf}$, and $F_{yr}$ represent the longitudinal force and lateral force on the front and rear wheels, respectively.

For vehicles running on general roads, when the tire cornering angle is small, the lateral force on the front and rear tires is represented as:

$$F_{yf} = C_{\alpha f} \cdot \alpha_f, F_{yr} = C_{\alpha r} \cdot \alpha_r \quad (2).$$

In formula (2), $C_{\alpha f}$ and $C_{\alpha r}$ represent the cornering stiffness of the front and rear tires, respectively, $\alpha_f$ and $\alpha_r$ represent the cornering angle of the front and rear tires, respectively, and $\alpha_f = \delta - (v_y + l_f r)/v_x$, $\alpha_r = (l_r r - v_y)/v_x$.

In order to calculate the tire longitudinal force in formula (2), the tire model can be adopted to determine. Common tire models include empirical models, theoretical models, and adaptive models. In order to ensure the accuracy and real-time performance of vehicle motion parameter measurement, the present invention adopts a brush tire model, and the longitudinal force of the front and rear tires is represented as:

$$F_{xf} = C_{xf}s_{xf} + \frac{(C_{xf}s_{xf})^3}{27(\mu_l F_{zf})^2} - \frac{(C_{xf}s_{xf})^2}{3\mu_l F_{zf}} \quad (3)$$

$$F_{xr} = C_{xr}s_{xr} + \frac{(C_{xr}s_{xr})^3}{27(\mu_l F_{zr})^2} - \frac{(C_{xr}s_{xr})^2}{3\mu_l F_{zr}}.$$

In formula (3), $C_{xf}$ and $C_{xr}$ represent the longitudinal stiffness of the front and rear tires, respectively, $\mu_l$ is a road adhesion coefficient, considering that the test road for the platoon lane change test is generally a dry and smooth asphalt road. The present invention takes that $\mu_l = 0.75$, the vertical loads $F_{zf}$ and $F_{zr}$ of the front and rear tires, the longitudinal slip rates $s_{xf}$ and $s_{xr}$ of the front and rear tires are calculated by the following formulas:

$$F_{zf} = \frac{9.8Ml_r}{(l_f + l_r)} \quad F_{zr} = \frac{9.8Ml_f}{(l_f + l_r)}. \quad (4)$$

$$s_{xf} = \frac{\omega_f R_{tyre} - v_{xf}}{\max(\omega_f R_{tyre}, v_{xf})} \quad s_{xr} = \frac{\omega_r R_{tyre} - v_{xr}}{\max(\omega_r R_{tyre}, v_{xr})}. \quad (5)$$

In the formulas, $R_{tyre}$ is the tire radius, $\omega_f$ and $\omega_r$ represent the rotational angular velocity of the front and rear wheels, respectively, obtained by calculating a linear velocity measured by a wheel velocity sensor, $v_{xf}$ and $v_{xr}$ represent the velocities of the front and rear axles along the tire direction, respectively, and $v_{xr} = v_x$, and $v_{xf} = v_x \cos\delta + (v_y + l_f r_l)\sin\delta$.

At the same time, the longitudinal and lateral velocities $v_x$ and $v_y$ of the vehicle, and the east and north positions $p_e$ and $p_n$ satisfy the following relationship:

$$\dot{p}_e = v_e = \sqrt{v_x^2 + v_y^2}\sin\beta \quad \dot{p}_n = v_n = \sqrt{v_x^2 + v_y^2}\cos\beta \quad (6).$$

In formula (6), $v_e$ and $v_n$ represent the east and north velocities of the vehicle, respectively, and β represents the azimuth of the vehicle's motion direction relative to the due north direction, and the following relationship is satisfied:

$$\beta = \begin{cases} \text{when } \arctan(v_e/v_n) & v_n > 0 \\ \text{when } \arctan(v_e/v_n) - \pi & v_n < 0, v_e < 0 \\ \text{when } \arctan(v_e/v_n) + \pi & v_n < 0, v_e > 0 \\ \text{when } \pi/2 & v_n = 0, v_e > 0 \\ \text{when } -\pi/2 & v_n = 0, v_e < 0 \text{ and} \\ 0 & v_n = v_e = 0 \end{cases}$$

For the intelligent vehicle platoon lane change process, taking a system state vector $X=[p_e \ p_n \ v_x \ v_y \ r_l]^T$, the superscript T of the matrix in the present invention represents the transposition of the matrix, and T represents the discrete period. According to the dynamics model described by formula (1), the system state equation is established:

$$X = f(X, U, W, \gamma) \quad (7)$$

In formula (7), $f(\square)$ is a 5-dimensional vector function, W is the zero-mean system Gaussian white noise, $\gamma$ is the zero-mean Gaussian white noise corresponding to the external input of the system, U is an external input vector of the system and $U=[\delta \ F_{xf} \ F_{xr}]^T$, where a steering angle of the front wheel is $\delta = \varepsilon_l/\rho_l$, the steering wheel angle $\varepsilon_l$ is obtained by a body CAN bus, $\rho_l$ is a transmission ratio of the steering system, and in the present invention, $\rho_l=10$, the tire longitudinal forces $F_{xf}$ and $F_{xr}$ are determined by the brush tire model.

Step III, vehicle motion state estimation based on an improved unscented Kalman filter algorithm.

In order to estimate the vehicle motion state in the process of platoon lane change, the method of filtering recursive estimation can be used, and a more comprehensive and accurate parameter estimation can be achieved by using less systematic observations. To process the nonlinear system state equation described in step I, a nonlinear Kalman filter is used.

In the common nonlinear filters, a particle filter has higher computational complexity. If the number of particles is reduced, the estimation accuracy may decrease. The extended Kalman filter algorithm introduces a linearization error, which is easy to reduce the filtering effect for the system with complex model. An Unscented Kalman Filter (UKF) has the same order as an Extended Kalman Filter in computational complexity, but the parameter estimation accuracy is higher than that of the Extended Kalman Filter. Therefore, the UKF algorithm is adopted to perform recursive estimation on the vehicle motion state parameters.

First, the present invention selects centimeter-level high-precision satellite positioning systems (such as GPS and Beidou) and inertial measurement units as measurement sensors for vehicle motion, and takes the vehicle's east position, north position, longitudinal forward velocity and yaw angular velocity as the system observation vectors, the observation equation of the system can be expressed as:

$$Z(t) = h(x(t), v(t)) \quad (8)$$

In formula (8), h is the observation equation, t is the time, and the system observation vector $Z=[p_{eg} \ p_{ng} \ v_{x\_m} \ \omega_{z\_m}]^T$, where $p_{eg}$ and $p_{ng}$ represent the observed values of the east and north positions of the vehicle, respectively, and are obtained by converting the latitude and longitude coordinates collected by a centimeter-level high-precision satellite positioning system (such as GPS and Beidou); and $v_{x\_m}$ and $\omega_{z\_m}$ represent the longitudinal forward velocity and yaw angular velocity of the vehicle, respectively, and are measured by an inertial measurement unit.

In the actual filtering recursion process, it is necessary to adopt a discretized filtering model. To this end discretization is performed on formulas (7) and (8), and the system state equation and observation equation after discretization are respectively:

$$\begin{cases} X(k) = f(X(k-1), U(k-1), W(k-1), \gamma(k-1)) \\ Z(k) = h(X(k), V(k)) \end{cases} \quad (9)$$

In formula (9), k is the discretization time, and the system process noise $W=[w_1 \ w_2 \ w_3 \ w_4 \ w_5]^T$, where $w_1$, $w_2$, $w_3$, $w_4$, and $w_5$ represent five system Gaussian white noise components, respectively, a Gaussian white noise covariance matrix corresponding to W(k−1) is $Q(k-1) = \text{diag}[\sigma_{w_1}^2 \ \sigma_{w_2}^2 \ \sigma_{w_3}^2 \ \sigma_{w_4}^2 \ \sigma_{w_5}^2]$, where $\sigma_{w_1}^2$, $\sigma_{w_2}^2$, $\sigma_{w_3}^2$, $\sigma_{w_4}^2$, and $\sigma_{w_5}^2$ represent the variances corresponding to Gaussian white noises $w_1$, $w_2$, $w_3$, $w_4$, and $w_5$, respectively. The system observation noise $V=[v_1 \ v_2 \ v_3 \ v_4]^T$, where $v_1$, $v_2$, $v_3$, and $v_4$ represent four system Gaussian white noise components, respectively, a measured white Gaussian noise covariance matrix corresponding to V(k) is $R(k) = \text{diag}[\sigma_{v_1}^2 \ \sigma_{v_2}^2 \ \sigma_{v_3}^2 \ \sigma_{v_4}^2]$, where $\sigma_{v_1}^2$, $\sigma_{v_2}^2$, $\sigma_{v_3}^2$, and $\sigma_{v_4}^2$ respectively represent the variances corresponding to the Gaussian white noises $v_1$, $v_2$, $v_3$, and $v_4$, and are determined according to the statistical characteristics of the measurement noise of the sensor's position, velocity, and yaw angular velocity. The external input noise of the system is $\gamma = [w_\delta \ w_{F_{xf}} \ w_{F_{sr}}]^T$, where $w_\delta$, $w_{F_{xf}}$, and $F_{xr}$, represent the zero-mean Gaussian white noise components corresponding to $\delta$, $F_{xf}$, and $F_{sr}$, respectively. These white noises are implied in the three external inputs of the system of the system state function f. The system state function is:

$$f(X, U, W, \gamma) = \begin{bmatrix} f_1(X(k-1), U(k-1), W(k-1), \gamma(k-1)) \\ f_2(X(k-1), U(k-1), W(k-1), \gamma(k-1)) \\ f_3(X(k-1), U(k-1), W(k-1), \gamma(k-1)) \\ f_4(X(k-1), U(k-1), W(k-1), \gamma(k-1)) \\ f_5(X(k-1), U(k-1), W(k-1), \gamma(k-1)) \end{bmatrix}$$

where, $f_1(X(k-1), U(k-1), W(k-1), \gamma(k-1)) =$
$$p_e(k-1) + \sqrt{v_x^2(k-1) + v_y^2(k-1)} \sin\beta \cdot T + w_1$$

$f_2(X(k-1), U(k-1), W(k-1), \gamma(k-1)) =$
$$p_n(k-1) + \sqrt{v_x^2(k-1) + v_y^2(k-1)} \cos\beta \cdot T + w_2$$

$f_3(X(k-1), U(k-1), W(k-1), \gamma(k-1)) =$
$$v_x(k-1) + \frac{T}{M}\left[Mv_y(k-1)r_l(k-1) + 2C_{\alpha f}\frac{v_y(k-1) + l_f r_l(k-1)}{v_x(k-1)}\delta(k-1)\right] +$$
$$\frac{2T}{M}[F_{xf}(k-1) + F_{xf}(k-1)] + w_3$$

$f_4(X(k-1), U(k-1), W(k-1), \gamma(k-1)) = v_y(k-1) +$
$$\frac{T}{M}\left[-Mv_x(k-1)r_l(k-1) + 2C_{\alpha f}\delta(k-1) - 2C_{\alpha f}\frac{v_y(k-1) + l_f r_l(k-1)}{v_x(k-1)} + \right.$$
$$\left. 2C_{\alpha r}\frac{l_r r_l(k-1) - v_y(k-1)}{v_x(k-1)}\right] + \frac{2T}{M}F_{xf}(k-1)\delta(k-1) + w_4$$

$f_5(X(k-1), U(k-1), W(k-1), \gamma(k-1)) =$
$$r_l(k-1) + \frac{T}{I_z}\left[2l_f C_{\alpha f}\delta(k-1) - 2l_f C_{\alpha f}\frac{v_y(k-1) + l_f r_l(k-1)}{v_x(k-1)} - \right.$$
$$\left. 2l_r C_{\alpha r}\frac{l_r r_l(k-1) - v_y(k-1)}{v_x(k-1)}\right] + \frac{2l_f T}{I_z}F_{xf}(k-1)\delta(k-1) + w_5.$$

Secondly, according to the system state equation and observation equation described by formula (9), the unscented Kalman filtering recursive process is established, and the filtering recursion is performed by using time update and measurement update.

(1) Initialization of the Input Variable and Parameter Calculation $$\begin{cases} \hat{X}_0 = E[X_0] \\ P_0 = E\left[(X_0 - \hat{X}_0)\cdot(X_0 - \hat{X}_0)^T\right] \end{cases} \quad (10)$$

In formula (10), $P_0$ is an initial error variance matrix, the variable with the superscript symbol ^ represents a filtering estimated value of the variable, and $\hat{X}_0$ is a filtering estimated value representing the initial value $x_0$ of the input variable.

(2) State Estimation $$\begin{cases} \xi_i(k-1) = \hat{X}(k-1), i=0 \\ \xi_i(k-1) = \hat{X}(k-1) + \left(\sqrt{(x_{dim}+\lambda)P(k-1)}\right)_i, \\ \quad i = 1, 2, \ldots, x_{dim} \\ \xi_i(k-1) = \hat{X}(k-1) - \left(\sqrt{(x_{dim}+\lambda)P(k-1)}\right)_i, \\ \quad i = x_{dim}+1, x_{dim}+2, \ldots, 2x_{dim} \end{cases} \quad (11)$$

In formula (11), $\xi_i(k-1)$ is the Sigma point, $\left(\sqrt{(x_{dim}+\lambda)P(k-1)}\right)_i$ is the i-th column of a square root of a weighted covariance matrix, and $x_{dim}$ is the number of dimensions of the state vector, taking $x_{dim}=5$.

$$\begin{cases} \omega_0^{(e)} = \dfrac{\lambda}{x_{dim}+\lambda} \\ \omega_0^{(c)} = \omega_0^{(e)} + (1-\alpha^2+\varepsilon) \\ \omega_i^{(c)} = \omega_i^{(e)} = \dfrac{1}{2(x_{dim}+\lambda)} \end{cases} \quad (12)$$

In formula (12), $\lambda$ is a distance parameter, and $\lambda = x_{dim}(\alpha^2-1)$, $\alpha$ is a first scale factor, $\varepsilon$ is a second scale factor, taking $\varepsilon=2$, $\omega_i^{(c)}$ and $\omega_i^{(e)}$ represent the weight coefficients of the mean and variance, respectively.

(3) Time Update $$\xi_i(k,k-1) = f[\xi_i(k,k-1)], i=0,1,\ldots,2x_{dim} \quad (13).$$

$$\hat{X}(k,k-1) = \Sigma_{i=0}^{2x_{dim}} \omega_i^{(e)} \xi_i(k,k-1) \quad (14).$$

$$P(k,k-1) = \Sigma_{i=0}^{2x_{dim}} \omega_i^{(c)} [\xi_i(k,k-1) - \hat{X}(k,k-1)] \cdot [\xi_i(k,k-1) - \hat{X}(k,k-1)]^T + Q(k) \quad (15).$$

In the formulas, $\hat{X}(k-1)$ is the optimal estimate at time k−1, and $P(k,k-1)$ is a one-step prediction error variance matrix at time k.

(4) Observation Update $$\chi_i(k,k-1) = h[\xi_i(k,k-1)] \quad (16).$$

$$\hat{Z}(k,k-1) = \Sigma_{i=0}^{2x_{dim}} \omega_i^{(e)} \chi_i(k,k-1) \quad (17).$$

$$P_{\tilde{Z}} = \Sigma_{i=0}^{2x_{dim}} \omega_i^{(c)} [\chi_i(k,k-1) - \hat{Z}(k,k-1)][\chi_i(k,k-1) - \hat{Z}(k,k-1)]^T + R(k) \quad (18).$$

$$P_{XZ} = \Sigma_{i=0}^{2x_{dim}} \omega_i^{(c)} [\xi_i(k,k-1) - \hat{X}(k,k-1)][\chi_i(k,k-1) - \hat{Z}(k,k-1)]^T \quad (19)$$

In the formulas, $X_i(k,k-1)$ represents the value of the observation equation transformed from the Sigma point set, $\hat{Z}(k,k-1)$ represents the one-step predicted observation value at time k recursively from time k−1, $P_{\tilde{Z}}$ is the predicted value covariance, and $P_{XZ}$ is the covariance of the state value and the measured value.

(5) Filter Update $$K(k) = P_{XZ} \cdot P_{\tilde{Z}}^{-1} \quad (20).$$

$$\hat{X}(k) = \hat{X}(k,k-1) + K(k) \cdot [Z(k) - \hat{Z}(k,k-1)] \quad (21).$$

$$P(k) = P(k,k-1) - K(k) \cdot P_{\tilde{Z}} \cdot K(k)^T \quad (22).$$

In the formulas, K(k) is a filter gain matrix, $\hat{X}(k)$ is a state quantity estimated value, and P(k) is an estimated error variance matrix.

In the actual test process, there are differences in the motion characteristics of different platoon vehicles, so that the noise statistical characteristics of the system cannot be consistent. When dealing with nonlinear problems, although the UKF algorithm has good parameter estimation accuracy, it still has certain shortcomings, that is, the prior statistical characteristics of system observation noise and process noise need to be accurately known.

In view of the above problems, the UKF algorithm is improved. Considering that the Adaptive Kalman Filter (AKF) has the advantages of suppressing filter divergence and correcting inaccurate system model parameters, the present invention combines the AKF filter with the UKF filter, and targeted improvement is made to improve the accuracy of system state estimation. Specifically:

(1) In order to reduce the influence of the system observation noise and process noise uncertainty on the filtering accuracy, a noise estimator with time-varying performance is introduced. (2) In order to improve the accuracy of the one-step prediction error variance matrix, and formulas (14-15) and formulas (17-18) are replaced with formulas (23-26):

$$\hat{X}(k,k-1) = \Sigma_{i=0}^{2x_{dim}} \omega_i^{(e)} \xi_i(k,k-1) + \hat{q}(k-1) \quad (23).$$

$$P(k,k-1) = \tau_j \Sigma_{i=0}^{2x_{dim}} \omega_i^{(c)} [\xi_i(k,k-1) - \hat{X}(k,k-1)][\xi_i(k,k-1) - \hat{X}(k,k-1)]^T + \hat{Q}(k) \quad (24).$$

$$\hat{Z}(k,k-1) = \Sigma_{i=0}^{2x_{dim}} \omega_i^{(e)} \chi_i(k,k-1) + \hat{r}(k) \quad (25).$$

$$P_{\tilde{Z}} = \Sigma_{i=0}^{2x_{dim}} \omega_i^{(c)} [\chi_i(k,k-1) - \hat{Z}(k,k-1)][\chi_i(k,k-1) - \hat{Z}(k,k-1)]^T + \hat{R}(k) \quad (26).$$

where the means and variance matrixes of the observation noise and system noise $\hat{r}(k)$, $\hat{R}(k)$, $\hat{q}(k)$, $\hat{Q}(k)$, and forgetting factors are:

$$\begin{cases} \hat{q}(k) = \delta_d(k)\left[\hat{X}(k) - \sum_{k=0}^{2x_{dim}} \omega_i^{(e)} \xi_i(k,k-1)\right] + [1-\delta_d(k)]\hat{q}(k-1) \\ \hat{Q}(k) = \delta_d(k)\Big\{K(k)\left[Z(k) - \sum_{k=0}^{2x_{dim}} \omega_i^{(e)} \chi_i(k,k-1)\right] \\ \quad \left[Z(k) - \sum_{k=0}^{2x_{dim}} \omega_i^{(e)} \chi_i(k,k-1)\right]^T K^T(k) + \\ \quad P(k) - \sum_{k=0}^{2x_{dim}} \omega_i^{(e)} [\xi_i(k,k-1) - \hat{X}(k,k-1)] \\ \quad [\xi_i(kk-1) - \hat{X}(k,k-1)]^T\Big\} + [1-\delta_d(k)]\hat{Q}(k-1) \\ \hat{r}(k) = [1-\delta_d(k)]\hat{r}(k-1) + \delta_d(k)\left[Z(k) - \sum_{k=0}^{2x_{dim}} \omega_i^{(e)} \chi_i(k,k-1)\right] \\ \hat{R}(k) = \delta_d(k)\Big\{\left[Z(k) - \sum_{k=0}^{2x_{dim}} \omega_i^{(e)} \chi_i(k,k-1)\right] \\ \quad \left[Z(k) - \sum_{k=0}^{2x_{dim}} \omega_i^{(e)} \chi_i(k,k-1)\right]^T - \\ \quad \sum_{k=0}^{2x_{dim}} \omega_i^{(c)} [\chi_i(k,k-1) - \hat{Z}(k,k-1)] \\ \quad [\chi_i(k,k-1) - \hat{Z}(k,k-1)]^T\Big\} + [1-\delta_d(k)]\hat{R}(k-1) \end{cases} \quad (27)$$

-continued $$\tau_f = \max\left\{1, \frac{\text{trace}(P_{\tilde{Z}}, P_{\tilde{Z}}^T)}{\text{trace}\left\{[\chi_i(k,k-1) - \hat{Z}(k,k-1)][\chi_i(k,k-1) - \hat{Z}(k,k-1)]^T\right\}}\right\}. \quad (28)$$

In the formulas, $\delta_d(k)$ represents an adaptive weighting parameter at time k, and $\delta_d(k)=1/k$, $\tau_f$ is the forgetting factor.

In conclusion, formulas (10-13), formula (16), and formulas (19-28) constitute the improved adaptive unscented Kalman filter algorithm.

Finally, after the above-mentioned improved filtering recursive calculation, the output state estimate $\hat{X}(k)$ is the east position, north position, longitudinal velocity, lateral velocity and yaw angular velocity information of the leading vehicle at time k.

Similarly, the dynamic model of each following vehicle is established by using the method described in step II and step III, and filtering recursion is performed, to output the motion state parameters of each following vehicle.

For the intelligent vehicles in the platoon, the output longitudinal velocity information is $V_{x\_j}=\{v_{x\_j}(0), v_{x\_j}(1), \ldots, v_{x\_j}(k)\}$, the lateral velocity information is $V_{y\_j}=\{v_{y\_j}(0), v_{y\_j}(1), \ldots, v_{y\_j}(k)\}$, the yaw angular velocity information is $R_j=\{r_{l\_j}(0), r_{l\_j}(1), \ldots, r_{l\_j}(k)\}$, and the position information is $P_j=\{(p_{e\_j}(0), p_{n\_j}(0)), (p_{e\_j}(1), p_{n\_j}(1)), \ldots, (p_{e\_j}(k), p_{n\_j}(k))\}$, (j=1, 2, 3 . . . , a).

The subscript j represents the j-th platoon vehicle in the platoon, for example, j=1 represents that the vehicle is the leading vehicle, and j=2 represents that the vehicle is the first following vehicle, $\alpha$ is the total number of platoon vehicles, $p_{e\_j}(k)$, $p_{n\_j}(k)$, $v_{x\_j}(k)$, $v_{y\_j}(k)$, and $r_{l\_j}(k)$ represent the east position, the north position, the longitudinal velocity, the lateral velocity and the yaw angular velocity of the j-th intelligent vehicle at time k, respectively.

Step IV, the evaluation indexes for platoon lane change performance are proposed and quantified.

In the existing national standards and test regulations, there is no clear and unified evaluation index for platoon lane change performance. Considering that it is difficult for a single evaluation index to cover all the information of the evaluation object, it cannot meet the needs of comprehensive and reliable platoon lane change performance evaluation. Therefore, the present invention proposes a multi-dimensional platoon lane change performance evaluation index from the perspectives of safety, reliability, comfort and other aspects of the lane change process for the following vehicles in platoon: lane change yaw stability, velocity consistency, safety distance margin and average vehicle clearance. Secondly, based on the position and velocity motion state parameters of the leading vehicle and the following vehicles output in step II, the above performance evaluation indexes are quantified. Specifically:

(1) Lane Change Yaw Stability $$\sigma_j = \sqrt{\frac{1}{s}\sum_{k=1}^{s}[r_j(k) - r_{E\_j}(k)]^2}. \quad (29)$$

In formula (29), $\sigma_j$ represents the lane change yaw stability of the j-th following vehicle, which reflects the aggressiveness of the following vehicle to change lanes, $r_{E\_j}(k)$ is an expected value of the yaw angular velocity at time k, and $r_{E\_j}(k)=\sqrt{v_{x\_j}^2(k)+v_{y\_j}^2(k)}/R_{road}$, the unit is rad/s, $R_{road}$ is the radius of curvature of the road, calculated from the position and velocity information output in step III, and s is the number of sampling points in the test process.

(2) Velocity Consistency $$\tau_{platoon} = \frac{1}{j-1}\sum\tau_j. \quad (30)$$

In formula (30), $\tau_{platoon}$ represents the velocity consistency in the platoon lane change process, $\tau_j$ represents the average relative velocity of the j-th following vehicle and the vehicle ahead in the same direction, and $$\tau_j = \frac{1}{s}\sum_{k=1}^{s}[v_{res\_j}(k) - v_{res\_j-1}(k)],$$

$v_{res\_j}(k)$ is the combined velocity of the j-th following vehicle at time k, in m/s.

(3) Safety Distance Margin $$L_j = \sqrt{[p_{e\_j}(k) - p_{e\_j-1}(k)]^2 + [p_{n\_j}(k) - p_{n\_j-1}(k)]^2} - L_v. \quad (31)$$

In formula (31), $L_j$ represents the safety distance margin between the j-th following vehicle and the vehicle ahead in the same direction, and $L_v$ is the body length of the following vehicle, and the unit is m.

(4) Average Vehicle Clearance $$L_{avg} = \frac{1}{j-1}\sum L_j \quad (32)$$

In formula (32), $L_{avg}$ is the average value of the platoon vehicle clearance, and the unit is m.

In evaluation of the intelligent vehicle platoon lane change performance, first, in the test scenario constructed in "step I", "step II" and "step III" are utilized to perform filtering recursion on each motion state parameter of the leading vehicle and the following vehicles. Secondly, according to "step IV", the quantitative values of the performance evaluation indexes are calculated. Finally, the lane change performance of the platoon vehicles is analyzed by quantitative evaluation.

Therefore, a comprehensive, accurate and reliable scientific quantitative evaluation of the intelligent vehicle platoon lane change performance is achieved.

In order to check the actual effect of the intelligent vehicle platoon lane change performance evaluation method disclosed in the present invention, an actual road test is carried out, and the basic conditions of the test are described as follows:

(1) Composition of an evaluation system: the evaluation system consists of hardware devices and a software system. The Nissan X-Trail test vehicle is used as the leading vehicle for the platoon lane change test, and is equipped with an embedded industrial computer, a high-precision MEMS integrated navigation system, a wireless communication module, an inverter and other hardware devices. The Chery Tiggo test vehicle is used as the following vehicle for the platoon lane change test, and is equipped with an embedded industrial computer, a high-performance integrated navigation system, a wireless communication module, an inverter and other hardware devices. The sensor installation position is close to the center of mass of the test vehicle, and the antenna installation position is located in the center of the roof.

(2) Test setup: two test vehicles are used to simulate the process of platoon lane change performance test. The leading vehicle is located in the middle of the test road and drives in a straight line at a set velocity. The following vehicles follow the leading vehicle at a set distance. When the leading vehicle passes through a test starting point, it is started to synchronously collect motion state parameters of the leading vehicle and the following vehicles. Then, when encountering an obstacle, the leading vehicle performs a lane change operation, and the following vehicles perform lane change with a similar motion trajectory. When the leading vehicle reaches an end point, a test is completed.

(3) Test environment: the test site is located near the airport expressway in Nanjing, Jiangsu Province, which is a typical expressway scenario in the intelligent vehicle function test scenario. The test road surface is a dry and smooth asphalt road.

(4) Test results: the test shows that the platoon lane change performance evaluation method proposed by the present invention has good performance, specifically:

1) Through the test method proposed by the present invention and the constructed platoon lane change performance evaluation system, the current problem of lack of quantitative evaluation of platoon lane change performance is solved, and a comprehensive and reliable scientific quantitative evaluation of intelligent vehicle platoon lane change performance is achieved.

2) Compared with the evaluation method of virtual simulation, the platoon lane change performance evaluation method based on an actual road test proposed by the present invention can better ensure the safety and reliability of the platoon lane change of the intelligent vehicles, and is more accurate and persuasive.

3) The measurement accuracy of vehicle motion state parameters and platoon lane change performance indexes is high, and the position measurement accuracy is less than or equal to 0.0295 m (RMS), and the accuracy can meet the high-precision test requirements of platoon lane change performance.

4) The environmental adaptability is high, under complex conditions such as wet and slippery roads, nights and rainy days, the method proposed by the present invention can complete the platoon lane change performance test with the same accuracy as the dry road surface.

Figure 3:
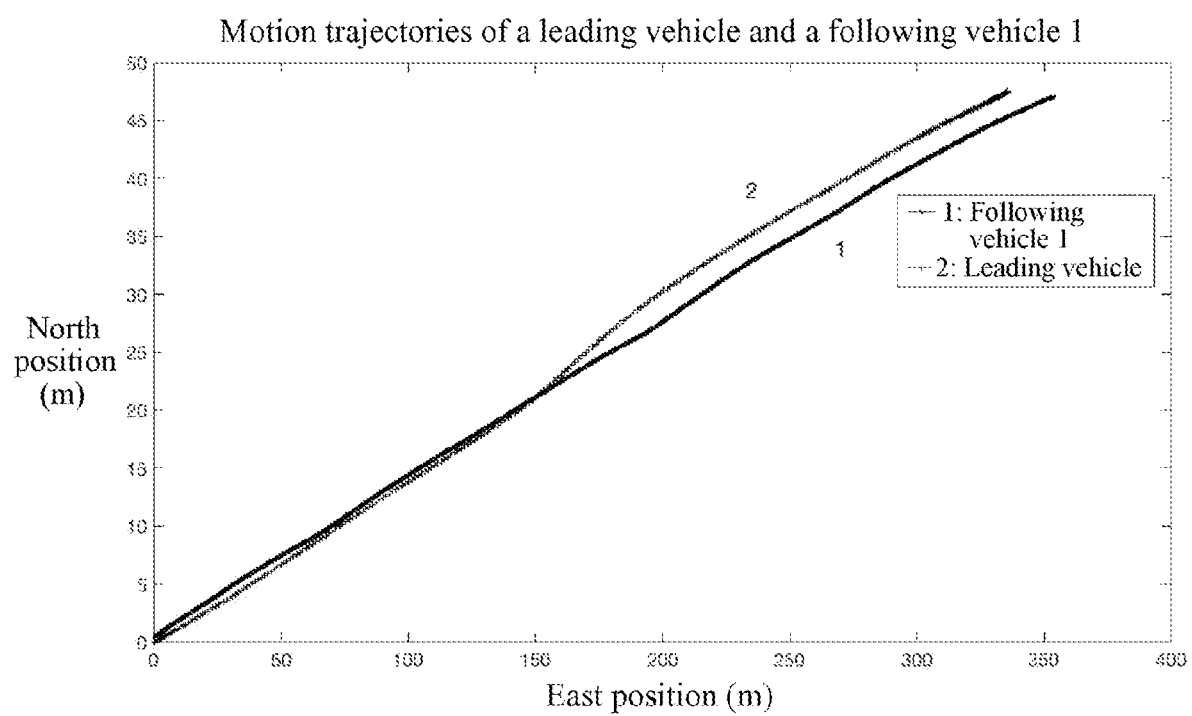
FIG. 3 is a schematic diagram of motion trajectories of a leading vehicle and following vehicles in an intelligent vehicle platoon lane change performance test.
Figure 4:
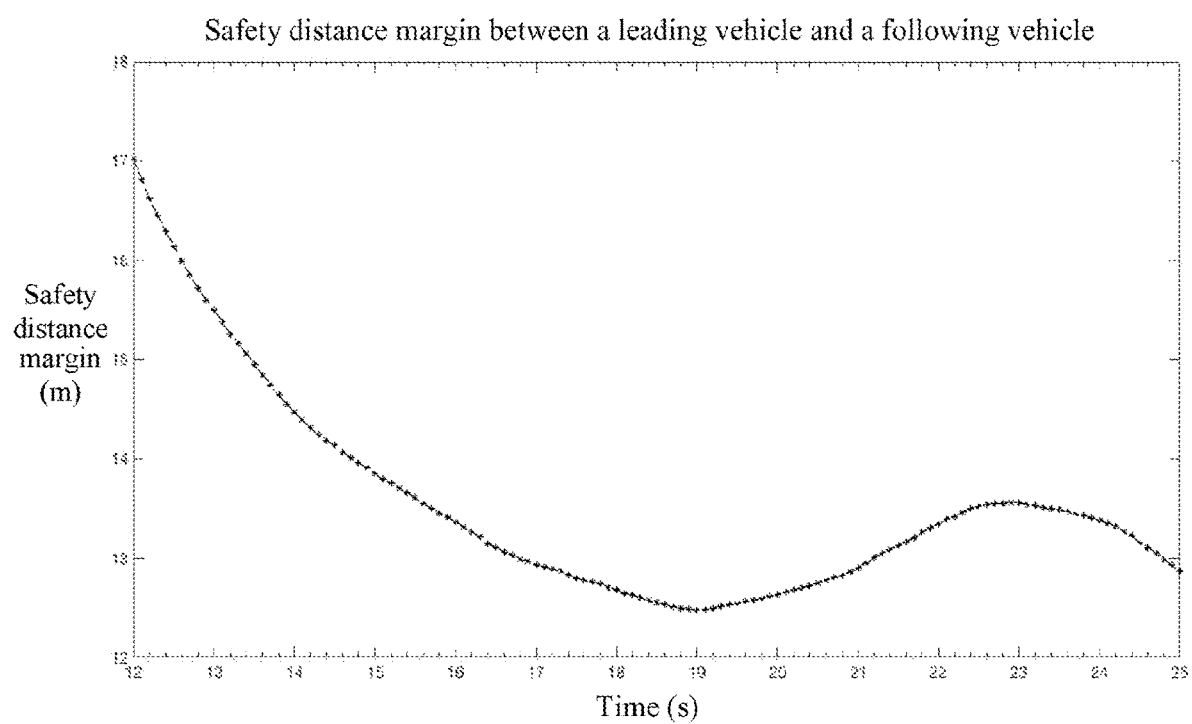
FIG. 4 is a graph showing the change of the safety distance margin of the following vehicles over time in an intelligent vehicle platoon lane change performance test.

In order to illustrate the actual effect of the present invention, the test results of a certain intelligent vehicle platoon lane change performance test are given below, and the test result curves are as shown in FIG. 3 and FIG. 4. The dense dotted line in FIG. 3 is the motion trajectory curve of the leading vehicle and the following vehicles during the test process, and FIG. 4 is the graph of the change of the safety distance margin of the leading vehicle and the following vehicles over time in the test process. Through the calculation, the platoon lane change performance evaluation index proposed by the present invention can be output, for example, the lane change yaw stability is 0.2782 rad/s, etc., which realizes comprehensive, accurate and reliable scientific quantitative evaluation of the intelligent vehicle platoon lane change performance.

What is claimed is:

1. A method for evaluating intelligent vehicle platoon lane change performance and constructing an evaluation system for platoon lane change performance, comprising: first, establishing an intelligent vehicle platoon lane change performance test scenario; secondly, establishing a three-degree of freedom nonlinear dynamics model; further, using an improved adaptive unscented Kalman filter algorithm to perform filter estimation on state variables of positions and velocities of platoon vehicles; and finally, based on accurately recursive vehicle motion state parameters, proposing and quantifying evaluation indexes for platoon lane change performance, and constructing an evaluation system for platoon lane change performance based on the proposed and quantified evaluation indexes for platoon lane change performance, wherein:

step I, establishing an intelligent vehicle platoon lane change performance test scenario first, providing a leading vehicle and following vehicles, selecting a high-grade highway as a test site, and secondly, establishing an intelligent vehicle platoon lane change performance test scenario, wherein the leading vehicle including a computer, a high-precision navigation system and a wireless communication module is located in the middle of a test road and drives in a straight line at a set velocity, and the following vehicles each including a computer, a high-precision navigation system and a wireless communication module follow the leading vehicle at a set interval; when the leading vehicle passes through a test starting point of the test site, motion state parameters of the leading vehicle and the following vehicles are synchronously collected and recorded; then, when encountering an obstacle on the test road, the leading vehicle conducts a lane change operation to avoid the obstacle, and the following vehicles receive lane change information from the leading vehicle that has conducted the lane change operation via the wireless communication modules and change lanes with a motion trajectory similar to that of the leading vehicle; and when the leading vehicle reaches an end point of the test site, a test is completed; and the leading vehicle refers to a first vehicle in platoon driving, and the following vehicles refer to intelligent vehicles behind the leading vehicle in platoon driving;

step II, establishing, by using computer hardware and software, a dynamic model for intelligent vehicle platoon lane change for front-wheel steered four-wheel vehicles in platoon driving, the following assumptions are made:

(1) ignoring pitch and roll motions of each vehicle, and ignoring the influence of a vehicle suspension on a tire axle;

(2) assuming that two tires of a front axle of the vehicle have the same steering angle, cornering angle, longitudinal force and lateral force, and assuming that two tires of a rear axle of the vehicle have the same steering angle, cornering angle, longitudinal force and side force to force; and (3) assuming that the direction of the front wheels of the vehicle is consistent with the current velocity direction of the vehicle;

according to the above requirements and assumptions, the three-degree of freedom model is utilized to perform dynamics modeling on the leading vehicle in the platoon vehicles; the three-degree of freedom dynamics model of the vehicle is defined, considering the longitudinal, lateral and yaw motions; wherein point G is the center of mass of the vehicle; the left and right wheels of the front axle are combined into one point, located at point A, and the left and right wheels of the rear axle are combined into one point, located at point B; the GX axis is the same as the vehicle's forward direction, the GY axis is determined by the right-hand screw rule, and the GZ axis is perpendicular to the vehicle motion plane and points to the ground; the dynamics model of the leading vehicle is described as:

$$\begin{cases} \dot{v}_x = v_y \cdot r_l + a_x \\ a_x = \frac{2}{M}[F_{xf}\cos\delta - F_{yf}\sin\delta + F_{xr}] \\ \dot{v}_y = -v_x \cdot r_l + a_y \\ a_y = \frac{2}{M}[F_{yf}\cos\delta + F_{xf}\sin\delta + F_{yr}] \\ \dot{r}_l = \frac{2}{I_z}[l_f F_{xf}\sin\delta + l_f F_{yf}\cos\delta - l_r F_{yr}] \end{cases} \quad (1)$$

wherein the superscript "•" represents the differential; $\dot{v}_x$ represents the differential of $v_x$•, $r_l$, $v_x$, $v_y$, $a_x$, and $a_y$ represent the yaw angular velocity, longitudinal velocity, lateral velocity, longitudinal acceleration and lateral acceleration of the leading vehicle, respectively; M, $\delta$, and $I_z$ represent the mass of the leading vehicle, a steering angle of the front wheel, and the moment of inertia around the vertical axis of a body coordinate system, respectively, $l_f$ and $l_r$ represent the distances from the center of mass of the vehicle to the front and rear axles, respectively, $F_{xf}$, $F_{xr}$, $F_{yf}$, and $F_{yr}$ represent the longitudinal force and lateral force on the front and rear wheels, respectively;

when the tire cornering angle is small, the lateral force on the front and rear tires is represented as:

$$F_{yf}=C_{\alpha f}\alpha_f F_{yr}=C_{\alpha r}\cdot \alpha_r \quad (2),$$

wherein $C_{\alpha f}$ and $C_{\alpha r}$ represent the cornering stiffness of the front and rear tires, respectively, $\alpha_f$ and $\alpha_r$ represent the cornering angle of the front and rear tires, respectively, and $\alpha_f=\delta-(v_y+l_f r)/v_x$, $\alpha_r=(l_r r-v_y)/v_x$;

the tire longitudinal force in formula (2) is calculated, a brush tire model is utilized, and the longitudinal force of the front and rear tires is represented as:

$$F_{xf} = C_{xf}s_{xf} + \frac{(C_{xf}s_{xf})^3}{27(\mu_l F_{zf})^2} - \frac{(C_{xf}s_{xf})^2}{3\mu_l F_{xf}} \quad (3)$$

$$F_{xr} = C_{xr}s_{xr} + \frac{(C_{xr}s_{xr})^3}{27(\mu_l F_{zr})^2} - \frac{(C_{xr}s_{xr})^2}{3\mu_l F_{zr}},$$

wherein $C_{xf}$ and $C_{xr}$ represent the longitudinal stiffness of the front and rear tires, respectively, $\mu_l$ is a road adhesion coefficient, taking $\mu_l$=0.75, the vertical loads $F_{zf}$ and $F_{zr}$ of the front and rear tires, the longitudinal slip rates $s_{xf}$ and $s_{xr}$ of the front and rear tires are calculated by the following formulas:

$$F_{zf} = \frac{9.8Ml_r}{(l_f + l_r)} F_{xr} = \frac{9.8Ml_f}{(l_f + l_r)} \quad (4)$$

$$s_{xf} = \frac{\omega_f R_{tyre} - v_{xf}}{\max(\omega_f R_{tyre}, v_{xf})} s_{xr} = \frac{\omega_r R_{tyre} - v_{xr}}{\max(\omega_r R_{tyre}, v_{xr})}, \quad (5)$$

wherein $R_{tyre}$ is the tire radius, $\omega_f$ and $\omega_r$ represent the rotational angular velocity of the front and rear wheels, respectively, obtained by calculating a linear velocity measured by a wheel velocity sensor, $v_{xf}$ and $v_{xr}$ represent the velocities of the front and rear axles along the tire direction, respectively, and $v_{xr}=v_x$, and $v_{xf}=v_x\cos\delta+(v_y+l_f r_l)\sin\delta$;

at the same time, the longitudinal and lateral velocities $v_x$ and $v_y$ of the vehicle, and the east and north positions $\rho_e$ and $\rho_n$ satisfy the following relationship:

$$\dot{p}_e=v_e=\sqrt{v_x^2+v_y^2}\sin\beta\ \dot{p}_n=v_n=\sqrt{v_x^2+v_y^2}\cos\beta \quad (6),$$

wherein $v_e$ and $v_n$ represent the east and north velocities of the vehicle, respectively, and $\beta$ represents the azimuth of the vehicle's motion direction relative to the due north direction, and the following relationship is satisfied:

$$\beta = \begin{cases} \arctan(v_e/v_n) & v_n > 0 \\ \arctan(v_e/v_n) - \pi & v_n < 0, v_e < 0 \\ \arctan(v_e/v_n) + \pi & v_n < 0, v_e > 0 \\ \pi/2 & v_n = 0, v_e > 0 \\ -\pi/2 & v_n = 0, v_e < 0 \\ 0 & v_n = v_e = 0 \end{cases},$$

wherein, for the intelligent vehicle platoon lane change process, taking a system state vector $X=[\rho_e \rho_n v_x v_y r_l]^T$, the superscript T of the matrix represents the transposition of the matrix, and T represents the discrete period; according to the dynamics model described by formula (1), the system state equation is established:

$$X=f(X,U,W,\gamma) \quad (7),$$

wherein $f(\bullet)$ is a 5-dimensional vector function, W is the zero-mean system Gaussian white noise, $\gamma$ is the zero-mean Gaussian white noise corresponding to the external input of the system, U is an external input vector of the system and $U=[\delta F_{xf} F_{xr}]^T$, wherein a steering angle of the front wheel is $\delta=\varepsilon_l/\rho_l$, the steering wheel angle $\varepsilon_l$ is obtained by a body CAN bus, $\rho_l$ is a transmission ratio of the steering system, and $\rho_l$=10, the tire longitudinal forces $F_{xf}$ and $F_{xr}$ are determined by the brush tire model;

step III, vehicle motion state estimation based on an improved unscented Kalman filter algorithm by the computer hardware and software a UKF algorithm is utilized to perform recursive estimation on the vehicle motion state parameters, and the observation equation of the system is represented as:

$$Z(t)=h(X(t),V(t)) \quad (8),$$

wherein h is the observation equation, t is the time, and the system observation vector $Z=[p_{eg}\ p_{ng}\ v_{x\_m}\ \omega_{z\_m}]^T$, wherein $p_{eg}$ and $p_{ng}$ represent the observed values of the east and north positions of the vehicle, respectively, and are obtained by converting the latitude and longitude coordinates collected by a centimeter-level high-precision satellite positioning system; and $v_{x\_m}$ and $\omega_{z\_m}$ represent the longitudinal forward velocity and yaw angular velocity of the vehicle, respectively, and are measured by an inertial measurement unit;

discretization is performed on formulas (7) and (8), and the system state equation and observation equation after discretization are respectively:

$$\begin{cases} X(k) = f(X(k-1), U(k-1), W(k-1), \gamma(k-1)) \\ Z(k) = h(X(k), V(k)) \end{cases}, \quad (9)$$

wherein k is the discretization time, and the system process noise $W=[w_1\ w_2\ w_3\ w_4\ w_5]^T$, wherein $w_1$, $w_2$, $w_3$, $w_4$, and $w_5$ represent five system Gaussian white noise components, respectively, a Gaussian white noise covariance matrix corresponding to W(k−1) is Q(k−1)=diag[$\sigma_{w_1}^2$ $\sigma_{w_2}^2$ $\sigma_{w_3}^2$ $\sigma_{w_4}^2$ $\sigma_{w_5}^2$], where $\sigma_{w_1}^2$, $\sigma_{w_2}^2$, $\sigma_{w_3}^2$, $\sigma_{w_4}^2$, and $\sigma_{w_5}^2$ represent the variances corresponding to Gaussian white noises $w_1$, $w_2$, $w_3$, $w_4$, and $w_5$, respectively; the system observation noise V=[$v_1$ $v_2$ $v_3$ $v_4$]$^T$, wherein $v_1$, $v_2$, $v_3$, and $v_4$ represent four system Gaussian white noise components, respectively, a measured white Gaussian noise covariance matrix corresponding to V(k) is R(k)=diag[$\sigma_{v_1}^2$ $\sigma_{v_2}^2$ $\sigma_{v_3}^2$ $\sigma_{v_4}^2$], wherein $\sigma_{v_1}^2$, $\sigma_{v_2}^2$, $\sigma_{v_3}^2$, and $\sigma_{v_4}^2$ respectively represent the variances corresponding to the Gaussian white noises $v_1$, $v_2$, $v_3$, and $v_4$, and are determined according to the statistical characteristics of the measurement noise of the sensor's position, velocity, and yaw angular velocity; the external input noise of the system is $\gamma=[w_\delta\ w_{F_{xf}}\ w_{F_{xr}}]^T$, wherein $w_\delta$, $w_{F_{xf}}$, and $w_{F_{xr}}$ represent the zero-mean Gaussian white noise components corresponding to $\delta$, $F_{xf}$, and $F_{xr}$, respectively; these white noises are implied in the three external inputs of the system of the system state function f; the system state function is:

$$f(X, U, X, \gamma) = \begin{bmatrix} f_1(X(k-1), U(k-1), W(k-1), \gamma(k-1)) \\ f_2(X(k-1), U(k-1), W(k-1), \gamma(k-1)) \\ f_3(X(k-1), U(k-1), W(k-1), \gamma(k-1)) \\ f_4(X(k-1), U(k-1), W(k-1), \gamma(k-1)) \\ f_5(X(k-1), U(k-1), W(k-1), \gamma(k-1)) \end{bmatrix}$$

wherein, $f_1(X(k-1), U(k-1), W(k-1), \gamma(k-1)) =$ $p_e(k-1) + \sqrt{v_x^2(k-1) + v_y^2(k-1)} \sin\beta \cdot T + w_1$ $f_2(X(k-1), U(k-1), W(k-1), \gamma(k-1)) =$ $p_n(k-1) + \sqrt{v_x^2(k-1) + v_y^2(k-1)} \cos\beta \cdot T + w_2$ $f_3(X(k-1), U(k-1), W(k-1), \gamma(k-1)) =$ $v_x(k-1) + \dfrac{T}{M}\left[Mv_y(k-1)r_l(k-1) + 2C_{\alpha f}\dfrac{v_y(k-1)+l_f r_l(k-1)}{v_x(k-1)}\delta(k-1)\right] +$ $\dfrac{2T}{M}[F_{xf}(k-1) + F_{xr}(k-1)] + w_3$ $f_4(X(k-1), U(k-1), W(k-1), \gamma(k-1)) =$ $\dfrac{T}{M}\left[-Mv_x(k-1)r_l(k-1) + 2C_{\alpha f}\delta(k-1) - 2C_{\alpha f}\dfrac{v_y(k-1)+l_f r_l(k-1)}{v_x(k-1)} +\right.$ $\left. 2C_{\alpha r}\dfrac{l_r r_l(k-1) - v_y(k-1)}{v_x(k-1)}\right] + \dfrac{2T}{M}F_{xf}(k-1)\delta(k-1) + w_4$ $f_5(X(k-1), U(k-1), W(k-1), \gamma(k-1)) =$ $r_l(k-1) + \dfrac{T}{I_z}\left[2l_f C_{\alpha f}\delta(k-1) - 2l_f C_{\alpha f}\dfrac{v_y(k-1)+l_f r_l(k-1)}{v_x(k-1)} -\right.$ $\left. 2l_r C_{\alpha r}\dfrac{l_r r_l(k-1) - v_y(k-1)}{v_x(k-1)}\right] + \dfrac{2l_f T}{I_z}F_{xf}(k-1)\delta(k-1) + w_5$, secondly, according to the system state equation and observation equation described by formula (9), the unscented Kalman filtering recursive process is established, and the filtering recursion is performed by using time update and measurement update:

(1) initializing the input variable and performing parameter calculation $$\begin{cases} \hat{X}_0 = E[X_0] \\ P_0 = E[(X_0 - \hat{X}_0) \cdot (X_0 - \hat{X}_0)^T] \end{cases} \quad (10)$$

wherein $P_0$ is an initial error variance matrix, the variable with the superscript symbol ^ represents a filtering estimated value of the variable, and $\hat{X}_0$ is a filtering estimated value representing the initial value $X_0$ of the input variable;

(2) state estimation $$\begin{cases} \xi_i(k-1) = \hat{X}(k-1), i = 0 \\ \xi_i(k-1) = \hat{X}(k-1) + (\sqrt{x_{dim}+\lambda)P(k-1)})_i, \\ i = 1, 2, \ldots, x_{dim} \\ \xi_i(k-1) = \hat{X}(k-1) - (\sqrt{x_{dim}+\lambda)P(k-1)})_i, \\ i = x_{dim}+1, x_{dim}+2, \ldots, 2x_{dim} \end{cases} \quad (11)$$

wherein $\xi_i(k-1)$ is the Sigma point, $(\sqrt{(x_{dim}+\lambda)P(k-1)})_i$ is the i-th column of a square root of a weighted covariance matrix, and $x_{dim}$ is the number of dimensions of the state vector, taking $x_{dim}=5$;

$$\begin{cases} \omega_0^e = \dfrac{\lambda}{x_{dim}+\lambda} \\ \omega_0^{(c)} = \omega_0^{(e)} + (1 - \alpha^2 + \varepsilon), \\ \omega_i^{(c)} = \omega_i^{(e)} = \dfrac{1}{2(x_{dim}+\lambda)} \end{cases} \quad (12)$$

wherein $\lambda$ is a distance parameter, and $\lambda=x_{dim}(\alpha^2-1)$, $\alpha$ is a first scale factor, $\varepsilon$ is a second scale factor, taking $\varepsilon=2$, $\omega_i^{(c)}$ and $\omega_i^{(e)}$ and represent the weight coefficients of the mean and variance, respectively;

(3) time update $\xi_i(k,k-1)=f[\xi_i(k,k-1)], i=0,1,\ldots,2x_{dim}$ (13)

$\hat{X}(k,k-1)=\Sigma_{i=0}^{2x_{dim}}\omega_i^{(e)}\xi_i(k,k-1)$ (14), $P(k,k-1)=\Sigma_{i=0}^{2x_{dim}}\omega_i^{(c)}[\xi_i(k,k-1)-\hat{X}(k,k-1)]\cdot[\xi_i(k,k-1)-\hat{X}(k,k-1)]^T+Q(k)$ (15)

wherein $\hat{X}(k-1)$ is the optimal estimate at time k−1, and P(k, k−1) is a one-step prediction error variance matrix at time k;

(4) observation update $\chi_i(k,k-1)=h[\xi_i(k,k-1)]$ (16)

$\hat{Z}(k,k-1)=\Sigma_{i=0}^{2x_{dim}}\omega_i^{(e)}\chi_i(k,k-1)$ (17)

$P_{\tilde{Z}}=\Sigma_{i=0}^{2x_{dim}}\omega_i^{(c)}[\chi_i(k,k-1)-\hat{Z}(k,k-1)][\chi_i(k,k-1)-\hat{Z}(k,k-1)]^T+R(k)$ (18)

$P_{XZ}=\Sigma_{i=0}^{2x_{dim}}\omega_i^{(c)}[\xi_i(k,k-1)-\hat{X}(k,k-1)][\chi_i(k,k-1)-\hat{Z}(k,k-1)]^T$ (19)

wherein $\chi_i(k, k-1)$ represents the value of the observation equation transformed from the Sigma point set, $\hat{Z}(k,k-1)$ represents the one-step predicted observation value at time k recursively from time k−1, $P_{\tilde{Z}}$ is the predicted value covariance, and $P_{XZ}$ is the covariance of the state value and the measured value;

(5) filter update $K(k)=P_{XZ}\cdot P_{\tilde{Z}}^{-1}$ (20)

$\hat{X}(k)=\hat{X}(k,k-1)+K(k)\cdot[Z(k)-\hat{Z}(k,k-1)]$ (21), $P(k)=P(k,k-1)-K(k)\cdot P_{\tilde{Z}}\cdot K(k)^T$ (22)

wherein K(k) is a filter gain matrix, $\hat{X}(k)$ is a state quantity estimated value, and P(k) is an estimated error variance matrix;

an AKF filter is combined with a UKF filter for targeted improvements, and formulas (14-15) and formulas (17-18) are replaced with formulas (23-26):

$$\hat{X}(k,k-1) = \Sigma_{i=0}^{2 \times dim} \omega_i^{(e)} \xi_i(k,k-1) + \hat{q}(k-1) \quad (23)$$

$$P(k,k-1) = \tau_f \Sigma_{i=0}^{2 \times dim} \omega_i^{(c)} [\xi_i(k,k-1) - \hat{X}(k,k-1)][\xi_i(k,k-1) - \hat{X}(k,k-1)]^T + \hat{Q}(k) \quad (24)$$

$$\hat{Z}(k,k-1) = \Sigma_{i=0}^{2 \times dim} \omega_i^{(e)} \chi_i(k,k-1) + \hat{r}(k) \quad (25)$$

$$P_{\tilde{z}} = \Sigma_{i=0}^{2 \times dim} \omega_i^{(c)} [\chi_i(k,k-1) - \hat{Z}(k,k-1)][\chi_i(k,k-1) - \hat{Z}(k,k-1)]^T + \hat{R}(k) \quad (26)$$

wherein the means and variance matrixes of the observation noise and system noise $\hat{r}(k)$, $\hat{R}(k)$, $\hat{q}(k)$, $\hat{Q}(k)$, and forgetting factors are:

$$\begin{cases} \hat{q}(k) = \delta_d(k)\left[\hat{X}(k) - \sum_{i=0}^{2 \times dim} \omega_i^{(e)} \xi_i(k, k-1)\right] + [1 - \delta_d(k)]\hat{q}(k-1) \\ \hat{Q}(k) = \delta_d(k)\left\{K(k)\left[Z(k) - \sum_{i=0}^{2 \times dim} \omega_i^{(e)} \chi_i(k, k-1)\right] \right. \\ \left[Z(k) - \sum_{i=0}^{2 \times dim} \omega_i^{(e)} \chi_i(k, k-1)\right]^T K^T(k) + P(k) - \sum_{i=0}^{2 \times dim} \\ \left[\xi_i(k, k-1) - \hat{X}(k, k-1)\right]\left[\xi_i(k, k-1) - \hat{X}(k, k-1)\right]^T\right\} + \\ [1 - \delta_d(k)]\hat{Q}(k-1) \\ \hat{r}(k) = [1 - \delta_d(k)]\hat{r}(k-1) + \delta_d(k)\left[Z(k) - \sum_{i=0}^{2 \times dim} \omega_i^{(e)} \chi_i(k, k-1)\right] \\ \hat{R}(k) = \delta_d(k)\left\{\left[Z(k) - \sum_{i=0}^{2 \times dim} \omega_i^{(e)} \chi_i(k, k-1)\right]\right. \\ \left[Z(k) - \sum_{i=0}^{2 \times dim} \omega_i^{(e)} \chi_i(k, k-1)\right]^T - \sum_{i=0}^{2 \times dim} \omega_i^{(e)} [\chi_i(k, k-1) - \\ \hat{Z}(k, k-1)][\chi_i(k, k-1) - \hat{Z}(k, k-1)]^T\right\} + \\ [1 - \delta_d(k)]\hat{R}(k-1) \end{cases} \quad (27)$$

$$\tau_f = \max\left\{1, \frac{\text{trace}(P_{\tilde{z}} P_{\tilde{z}}^T)}{\text{trace}\left\{[X_i(k, k-1) - \hat{Z}(k, k-1)][X_i(k, k-1) - \hat{Z}(k, k-1)]^T\right\}}\right\} \quad (28)$$

wherein $\delta_d(k)$ represents an adaptive weighting parameter at time k, and $\delta_d(k) = 1/k$, $\tau_f$ is the forgetting factor;

in conclusion, formulas (10-13), formula (16), and formulas (19-28) constitute the improved adaptive unscented Kalman filter algorithm;

finally, after the above-mentioned improved filtering recursive calculation, the output state estimate $\hat{X}(k)$ is the east position, north position, longitudinal velocity, lateral velocity and yaw angular velocity information of the leading vehicle at time k;

the dynamics model of each following vehicle is established by using the method described in step II and step III, and filtering recursion is performed, to output the motion state parameters of each following vehicle;

for the intelligent vehicles in the platoon, the output longitudinal velocity information is $V_{x\_j} = \{v_{x\_j}(0), v_{x\_j}(1), \ldots, v_{x\_j}(k)\}$, the lateral velocity information is $V_{y\_j} = \{v_{y\_j}(0), v_{y\_j}(1), \ldots, v_{y\_j}(k)\}$, the yaw angular velocity information is $R_j = \{r_{l\_j}(0), r_{l\_j}(1), \ldots, r_{l\_j}(k)\}$, and the position information is $P_j = \{(p_{e\_j}(0), p_{n\_j}(0)), (p_{e\_j}(1), p_{n\_j}(1)), \ldots, (p_{e\_j}(k), p_{n\_j}(k))\}$, (j=1, 2, 3 ..., a);

wherein the subscript j represents the j-th platoon vehicle in the platoon, a is the total number of platoon vehicles, $p_{e\_j}(k)$, $p_{n\_j}(k)$, $v_{x\_j}(k)$, $v_{y\_j}(k)$, and $r_{l\_j}(k)$ represent the east position, the north position, the longitudinal velocity, the lateral velocity and the yaw angular velocity of the j-th intelligent vehicle at time k, respectively;

step IV, proposing and quantifying the evaluation indexes for platoon lane change performance by using the computer hardware and software first, multi-dimensional platoon lane change performance evaluation indexes are proposed: lane change yaw stability, velocity consistency, safety distance margin, and average vehicle clearance; secondly, based on the position and velocity motion state parameters of the leading vehicle and the following vehicles output in step II, the above performance evaluation indexes are quantified;

(1) lane change yaw stability $$\sigma_j = \sqrt{\frac{1}{S}\sum_{k=1}^{s}[r_j(k) - r_{E\_j}(k)]^2}, \quad (29)$$

wherein $\sigma_j$ represents the lane change yaw stability of the j-th following vehicle, which reflects the aggressiveness of the following vehicle to change lanes, $r_{E\_j}(k)$ is an expected value of the yaw angular velocity at time k, and $r_{E\_j}(k) = \sqrt{V_{x\_j}^2(k) + v_{y\_j}^2(k)}/R_{road}$, the unit is rad/s, $R_{road}$ is the radius of curvature of the road, calculated from the position and velocity information output in step III, and s is the number of sampling points in the test process;

(2) velocity consistency $$\tau_{platoon} = \frac{1}{j-1}\sum \tau_j, \quad (30)$$

wherein $\tau_{platoon}$ represents the velocity consistency in the platoon lane change process, $\tau_j$ represents the average relative velocity of the j-th following vehicle and the vehicle ahead in the same direction, and $$\tau_j = \frac{1}{s}\sum_{k=1}^{s}[v_{res\_j}(k) - v_{res\_j-1}(k)],$$

$v_{res\_j}(k)$ is the combined velocity of the j-th following vehicle at time k, in m/s;

(3) safety distance margin $$L_j = \sqrt{[P_{n\_j}(k) - p_{n\_j-2}(k)]^2 + [p_{n\_j}(k) - p_{n\_j-1}(k)]^2} - L_v, \quad (31)$$

wherein $L_j$ represents the safety distance margin between the j-th following vehicle and the vehicle ahead in the same direction, and $L_v$ is the body length of the following vehicle, and the unit is m;

(4) average vehicle clearance $$L_{avg} = \frac{1}{j-1}\sum L_j, \quad (32)$$

wherein $L_{avg}$ is the average value of the platoon vehicle clearance, and the unit is m;

in evaluation of the intelligent vehicle platoon lane change performance, first, in the test scenario constructed in "step I", "step II" and "step III" are utilized to perform filtering recursion on each motion state parameter of the leading vehicle and the following vehicles; secondly, according to "step IV", the quantitative values of the performance evaluation indexes are calculated; and finally, the lane change performance of the platoon vehicles is analyzed by quantitative evaluation.

* * * * *